(12) United States Patent  (10) Patent No.: US 8,218,513 B2
Shinozaki (45) Date of Patent: Jul. 10, 2012

(54) BASE STATION AND DATA TRANSFERRING METHOD

(75) Inventor: Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 643 days.

(21) Appl. No.: 12/417,754

(22) Filed: Apr. 3, 2009

(65) Prior Publication Data

US 2010/0002663 A1    Jan. 7, 2010

(30) Foreign Application Priority Data

Jul. 4, 2008    (JP) ................................. 2008-175580

(51) Int. Cl.
*H04W 4/00* (2009.01)
(52) U.S. Cl. ...................................... 370/338
(58) Field of Classification Search .................. 370/203, 370/229–258, 298–306, 351–356, 357–395, 370/395.1, 395.2, 395.21, 395.3, 395.31, 370/395.32, 395.4, 395.41, 395.42, 395.43, 370/395.5, 395.52, 395.53, 395.54, 395.6, 370/395.61, 396–411, 412–429, 503–520
See application file for complete search history.

(56) References Cited

U.S. PATENT DOCUMENTS

| | | | |
|---|---|---|---|
| 2002/0002045 A1* | 1/2002 | Aoki et al. ..................... | 455/422 |
| 2002/0024939 A1* | 2/2002 | Silventoinen et al. ........ | 370/328 |
| 2003/0148774 A1* | 8/2003 | Naghian et al. ............... | 455/456 |
| 2003/0174666 A1* | 9/2003 | Wallace et al. ............... | 370/324 |
| 2004/0204097 A1* | 10/2004 | Scheinert et al. ............. | 455/561 |
| 2004/0240430 A1* | 12/2004 | Lin et al. ...................... | 370/352 |
| 2005/0237962 A1* | 10/2005 | Upp et al. ..................... | 370/313 |
| 2005/0237963 A1* | 10/2005 | Storm ........................... | 370/320 |
| 2007/0097983 A1* | 5/2007 | Nylander et al. .......... | 370/395.2 |
| 2007/0105527 A1* | 5/2007 | Nylander et al. ............. | 455/403 |
| 2007/0105568 A1* | 5/2007 | Nylander et al. ............. | 455/458 |
| 2008/0102877 A1* | 5/2008 | Suemitsu et al. ............. | 455/522 |

(Continued)

FOREIGN PATENT DOCUMENTS

EP    1 753 180    2/2007

(Continued)

OTHER PUBLICATIONS

3GPP TS 43.318 V8.0.0, 3rd Generation Partnership Project; Technical Specification Group GSM/EDGE Radio Access Network; Generic Access Network (GAN); Stage 2 (Release 8), Nov. 2007.

(Continued)

*Primary Examiner* — Kwang B Yao
*Assistant Examiner* — Jung-Jen Liu
(74) *Attorney, Agent, or Firm* — Fujitsu Patent Center

(57) ABSTRACT

A base station forms a communication area communicable with a mobile communication network through a local network that includes the base station. The base station includes an obtaining unit that obtains a local-network address assigned to a mobile terminal in the communication area to communicate with a communication terminal in the local network; another obtaining unit that obtains a mobile-network address assigned to the mobile terminal to communicate with the mobile communication network; a storing unit that correlates and stores therein the local-network address and the mobile-network address; a receiving unit that receives, from the communication terminal, data having a destination address that is the local-network address; a converting unit that converts the destination address into the mobile-network address correlated with the local-network address and stored in the storing unit; and a transmitting unit that transmits, to the mobile terminal, the data whose destination address has been converted.

6 Claims, 22 Drawing Sheets

U.S. PATENT DOCUMENTS

| | | | |
|---|---|---|---|
| 2008/0139249 A1* | 6/2008 | Kim | 455/561 |
| 2009/0047955 A1* | 2/2009 | Frenger et al. | 455/436 |
| 2009/0097436 A1* | 4/2009 | Vasudevan et al. | 370/328 |
| 2009/0129348 A1* | 5/2009 | Osborn | 370/338 |
| 2009/0135793 A1* | 5/2009 | Nandagopal et al. | 370/338 |
| 2009/0247157 A1* | 10/2009 | Yoon et al. | 455/434 |
| 2009/0305699 A1* | 12/2009 | Deshpande et al. | 455/434 |
| 2009/0311987 A1* | 12/2009 | Edge et al. | 455/404.1 |
| 2010/0195621 A1* | 8/2010 | Kekki et al. | 370/332 |
| 2010/0240369 A1* | 9/2010 | Law et al. | 455/436 |
| 2011/0014894 A1* | 1/2011 | Batkin et al. | 455/410 |

FOREIGN PATENT DOCUMENTS

| | | |
|---|---|---|
| JP | 2007-282255 | 10/2007 |
| WO | WO-2005/107279 A1 | 11/2005 |
| WO | 2005/114926 | 12/2005 |

OTHER PUBLICATIONS

3GPP TR 43.902 V7.0.1, 3rd Generation Partnership Project; Technical Specification Group GSM/EDGE Radio Access Network; Enhanced Generic Access Networks (EGAN) study; (Release 7), Aug. 2007.

3GPP TS 44.318 V7.4.0, 3rd Generation Partnership Project; Technical Specification Group GSM/EDGE Radio Access Network Generic Access (GA) to the A/Gb interface; Mobile GA interface layer 3 specification (Release 7), Sep. 2007.

3GPP TR R3.020 V0.7.0, 3rd Generation Partnership Project; Technical Specification Group Radio Access Network; Home (e)NodeB; Network aspects (Release 8), May 2008.

3G TS 23.060 DRAFT V3.2.0, 3rd Generation Partnership Project; Technical Specification Group Services and System Aspects; Digital cellular telecommunications system (Phase 2+); General Packet Radio Service (GPRS); Service description; Stage 2 (3G TS 23.060 version 3.2.0), Dec. 1999.

Kineto Wireless Inc. et al., 3GPP TSG-RAN WG3 Meeting #59bis, "3G HNB Access Network Architecture Considerations", Discussion and Decision, Shenzhen, China, Mar. 31-Apr. 3, 2008, R3-080698, pp. 1-7.

Extended European Search Report dated Dec. 12, 2011 for corresponding European Application No. 09157696.7.

* cited by examiner

BASE STATION AND DATA TRANSFERRING METHOD

CROSS REFERENCE TO RELATED APPLICATIONS

This application is based upon and claims the benefit of priority of the prior Japanese Patent Application No. 2008-175580, filed on Jul. 4, 2008, the entire contents of which are incorporated herein by reference.

FIELD

The embodiment discussed herein is related to a base station and a data transferring method that execute wireless communication.

BACKGROUND

Recently, provision of a mobile telephone service area that employs a small-scale base station called "femto-cell" is conceived. A "femto-cell" is generally formed by connecting a gateway for a femto-cell (FGW) installed on a mobile telephone service provider side and a small-scale base station for a femto-cell (femtocell Access Point (femtoAP)) by an IP broadband line such as an ADSL or an FTTH.

As femto-cell services, the provision of various services are considered including a low-priced flat-rate service by the mobile telephone service provider in addition to provision of a signal receiving environment that is better than that of a macro-cell, a high-speed data communication environment associated therewith, effecting improved efficiency of frequency usage by allowing a monopoly of specific users of frequencies.

In an environment having a broadband line, the femto-cell services can be easily adopted by merely connecting the environment to a femtoAP. A femtoAP is installed in the residence of a user who adopts the services. Therefore, it is expected that control by mobile telephone service providers will be mitigated such that the management restrictions imposed by the mobile telephone service providers will be mitigated and users will be able to freely move the location of and turn on and off the femtoAP.

Femto-cell services have a potential for realizing a communication link between an information terminal and home appliances in addition to provision of services associated with the above advantages. For example, communication between a personal computer (PC) and a mobile telephone is usually realized using a memory card, or a dedicated communication cable and software as a medium. However, the manipulation of inserting and pulling out a memory card or a communication cable is very troublesome for a user.

With the prevalence of broadband communication and the increase of content types and content sizes handled in recent years, data places a heavy burden on the memory of mobile telephones and cannot be completely stored in the memory when directly downloaded from, for example, a site on the Internet. Use of a mobile telephone as a music player is prevailing due to the integration of mobile telephones with a portable music player function, resulting in a demand for storage of music files downloaded at a fee.

On average, mobile telephone users purchase a new mobile telephone approximately every two years. However, to transfer files downloaded to the mobile telephone to a newly purchased mobile telephone, the user must transfer and store the files of the old mobile telephone on a PC and subsequently transfer the files later to the mobile telephone newly purchased. Therefore, increased simplification of the communication between the mobile telephone and the PC is demanded (see, e.g., Japanese Laid-Open Patent Application Publication No. 2007-282255).

"WiFi" (a wireless local area network (LAN)) is conceivable as an ordinary approach of communication between a mobile telephone and a PC; and a mobile terminal of a 3GPP scheme that includes the WiFi is actually exists. However, this dual terminal has a problem in terms of power consumption and price. Although the femto cell solves these problems, the wireless scheme that the femto cell supports includes only wireless schemes for mobile communication (for example, 3GPP).

However, for the femto-cell service, it is basically assumed that communication in a residence between a mobile communication network and a mobile terminal is realized through the femtoAP installed in the residence while the communication between a PC and the mobile terminal in the residence is not basically assumed. Therefore, a problem has arisen in that transmission of a packet from the PC to the mobile terminal in the residence is difficult.

For an ordinary femto-cell service, a mobile network-use address for a mobile terminal is assigned from a mobile communication network to the mobile terminal each time a data communication request is issued to the mobile terminal. Therefore, at the residence of a user, when the user tries to transmit a packet from a PC to the mobile terminal, the user cannot obtain the mobile network-use address assigned to the mobile terminal at that time.

Even if the PC is successful in obtaining the mobile network-use address assigned to the mobile terminal, when the PC transmits the packet using the mobile network-use address as the destination address of the packet, the transmitted packet arrives at the mobile terminal through the mobile communication network because, for example, according to the 3GPP, a tunnel is created between the femtoAP and the mobile communication network and, a communication path is formed between the femtoAP and the mobile terminal. Therefore, the communication resources of the mobile communication network are burdened and the time necessary for transmitting the packet from the PC to the mobile terminal becomes long.

SUMMARY

According to an aspect of an embodiment, base station forms a communication area that is communicable with a mobile communication network through a local network that includes the base station. The base station includes a first obtaining unit that obtains a local-network address assigned from the local network to a mobile terminal in the communication area to execute data communication with a communication terminal in the local network; a second obtaining unit that obtains a mobile-network address assigned from the mobile communication network to the mobile terminal to execute data communication with the mobile communication network; a storing unit that correlates and stores therein the local-network address obtained by the first obtaining unit and the mobile-network address obtained by the second obtaining unit; a receiving unit that receives, from the communication terminal, data having a destination address that is the local-network address; a converting unit that converts the destination address of the data received by the receiving unit into the mobile-network address correlated with the local-network address and stored in the storing unit; and a transmitting unit that transmits, to the mobile terminal, the data whose destination address has been converted by the converting unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings.

Figure 1:
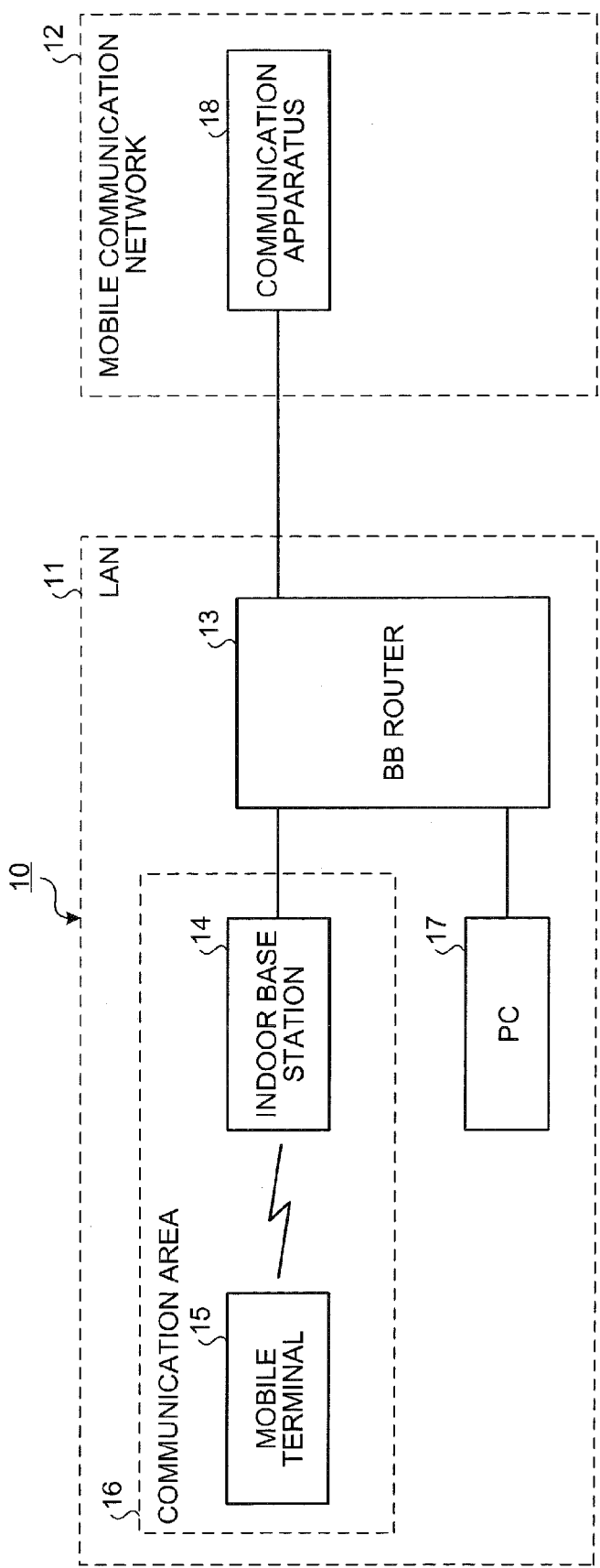
FIG. 1 is a block diagram of an overview of a communication system according to an embodiment.

FIG. 1 is a block diagram of an overview of a communication system according to an embodiment. As depicted in FIG. 1, a communication system 10 according to the embodiment includes a LAN 11 and a mobile communication network 12. The LAN 11 (a network on the premises) includes a BB router 13, an indoor base station 14, a mobile terminal 15, and a PC 17. The mobile communication network includes a communication apparatus 18.

The communication apparatus 18 is connected to the BB router 13 of the LAN 11. The communication apparatus 18 is a FGW and has a function of managing data communication in the mobile communication network 12. More specifically, the communication apparatus 18 has a function of assigning a mobile-network address that is used in data communication in the mobile communication network 12.

The BB router 13 is connected to the mobile communication network 12, which is external of the LAN 11. The BB router 13 is connected to the indoor base station 14 and the PC 17. The connection between the BB router 13 and the indoor base station 14 and the connection between the BB router 13 and the PC 17 may be a wired connection such as Ethernet (a registered trademark) or may be a wireless connection such as IEEE802.11. The indoor base station 14 may be incorporated in the BB router 13.

The indoor base station 14 is a femtoAP. The indoor base station 14 forms a communication area 16 (femto-cell) by emitting an electro-magnetic wave around the indoor base station 14. In the communication area 16, the mobile terminal 15 is communicable with the mobile communication network 12 through the LAN 11. The indoor base station 14 and the mobile terminal 15 are connected by a wireless interface such as wideband code division multiple access (W-CDMA).

The mobile terminal 15 executes location registration when the mobile terminal 15 moves into the communication area 16 of the indoor base station 14. More specifically, the mobile terminal 15 transmits a location registration request to the indoor base station 14. The location registration request transmitted from the mobile terminal 15 is received by the communication apparatus 18 through the indoor base station 14 and the BB router 13. When the communication apparatus 18 receives the location registration request, the communication apparatus 18 executes the location registration of the mobile terminal 15, assigns a mobile-network address to the mobile terminal 15, and transmits the mobile-network address to the mobile terminal 15.

The mobile-network address is an IP address that is assigned to the mobile terminal 15 for the mobile terminal 15 to execute packet communication with the mobile communication network 12. The mobile-network address transmitted from the communication apparatus 18 is received by the mobile terminal 15 through the BB router 13 and the indoor base station 14. The mobile terminal 15 executes packet communication with the mobile communication network 12 using the received mobile-network address as the IP address of the mobile terminal 15.

The mobile terminal 15 stores therein the mobile-network address until the mobile terminal 15 moves out of the coverage of the indoor base station 14. The indoor base station 14 obtains the address that is assigned by the communication apparatus 18 to the mobile terminal 15. For example, the indoor base station 14 obtains the mobile-network address by intercepting the address when the indoor base station 14 relays the address transmitted from the communication apparatus 18 to the mobile terminal 15. Alternatively, the communication apparatus 18 may transmit the mobile-network address to the indoor base station 14 in addition to the mobile terminal 15, and thereby, the indoor base station 14 may obtain the mobile-network address.

The indoor base station 14 obtains a LAN address (address for use in the local network) for the mobile terminal 15 to execute communication with the PC 17 in the LAN 11. For example, the BB router 13 has a dynamic host configuration protocol (DHCP) function. In this case, the indoor base station 14 obtains a LAN address from the BB router 13. The indoor base station 14 generates a conversion table that correlates the mobile-network address received from the communication apparatus 18 with the LAN address obtained from the BB router 13.

The PC 17 is a communication terminal that includes a communication function. When the LAN address is assigned to the mobile terminal 15, the LAN address assigned to the mobile terminal 15 is reported throughout the LAN 11 through the BB router 13. The PC 17 transmits an IP packet (data) to be transmitted to the mobile terminal 15, using the LAN address assigned to the mobile terminal 15 as the destination address of the IP packet.

The IP packet transmitted from the PC 17 is received by the indoor base station 14 through the BB router 13. The indoor base station 14 converts the destination address of the received IP packet from the LAN address to the mobile-network address based on the conversion table generated by the indoor base station 14. The indoor base station 14 transmits the IP packet whose destination address has been converted into the mobile-network address, to the mobile terminal 15. The mobile terminal 15 receives the IP packet transmitted from the indoor base station 14.

In this manner, the conversion table is generated in advance by the indoor base station 14 and the conversion between the LAN address and the mobile-network address is executed. Thereby, the PC 17 can transmit the IP packet to the mobile terminal 15 using the LAN address reported throughout the LAN 11 as the destination address even without obtaining the mobile-network address assigned by the communication apparatus 18 to the mobile terminal 15.

On the other hand, the mobile terminal 15 can receive the IP packet from the PC 17 in the femto-cell scheme using the mobile-network address even without having a data communication function supporting the LAN 11. Therefore, without adding any further function to the mobile terminal 15, the IP packet can be transmitted from the PC 17 to the mobile terminal 15 through the indoor base station 14 in the LAN 11.

By converting the destination address of the data from the LAN address to the mobile-network address in the indoor base station 14 that executes direct communication with the mobile terminal 15, data having the mobile-network address as a destination address can be directly transmitted to the mobile terminal 15 without passing through the mobile communication network 12. Thus, the data can be transferred at a high speed from the PC 17 to the mobile terminal 15 in the LAN 11 without burdening the communication resources of the mobile communication network 12.

By obtaining the mobile-network address when the location registration of the mobile terminal 15 is executed in the communication apparatus 18 of the mobile communication network 12, the indoor base station 14 can transfer, to the mobile terminal 15, the IP packet transmitted from the PC 17 as soon as the mobile terminal 15 becomes communicable in the LAN 11. The indoor base station 14 can store therein the obtained LAN address and the mobile-network address until the mobile terminal 15 leaves the communication area 16.

Thereby, from the time when the mobile terminal 15 enters the communication area 16 to the time when the mobile terminal 15 leaves the communication area 16, the IP packet transmitted from the PC 17 can be transferred to the mobile terminal 15. Alternatively, when the mobile terminal 15 leaves the communication area 16, the indoor base station 14, without retaining the mobile-network address, may return the mobile-network address to the communication apparatus 18. Thereby, a shortage of mobile-network addresses for use in the mobile communication network 12 can be prevented.

When the indoor base station 14 receives the IP packet transmitted from the PC 17, the communication mode used by the mobile terminal 15 may be switched to another communication mode that enables reception of the data. Thereby, even when the communication mode of the mobile terminal 15 is "stand by" or "power saving", the IP packet transmitted from the PC 17 may be transferred to the mobile terminal 15.

Figure 6:
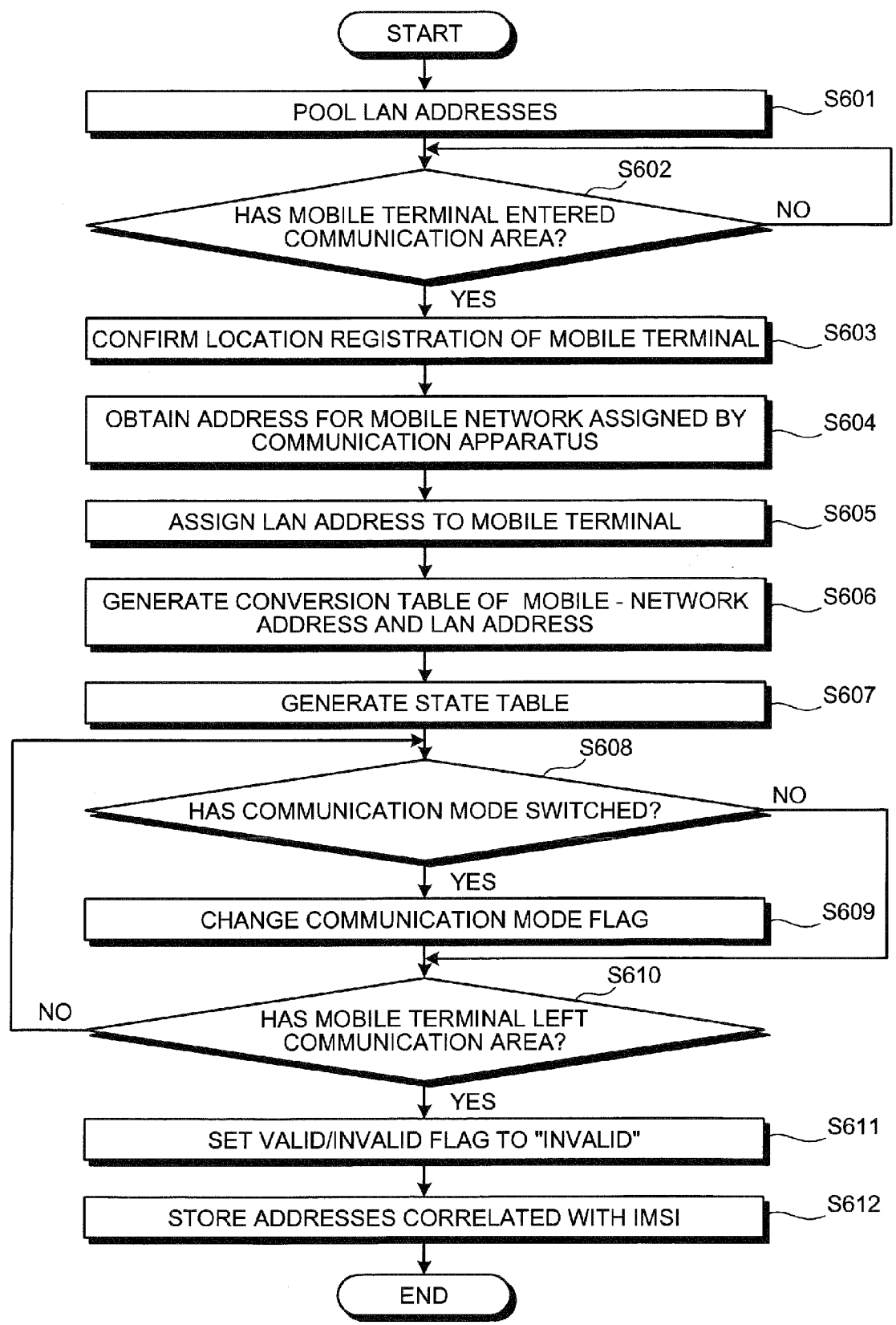
FIG. 6 is a flowchart of an exemplary conversion-table generation operation executed by the indoor base station.

A configuration described in FIG. 6.1.2.1-3. of "Detailed 3G HNB System Architecture", 3GPP TR R3.020 V0.7.0 (2008-05), etc., is employable as a basic configuration of the communication system 10. In the FIG. 6.1.2.1-3., "UE" is the mobile terminal 15, "3G HNB" is the indoor base station 14, and "HNB-GW" is the communication apparatus 18.

Figure 2:
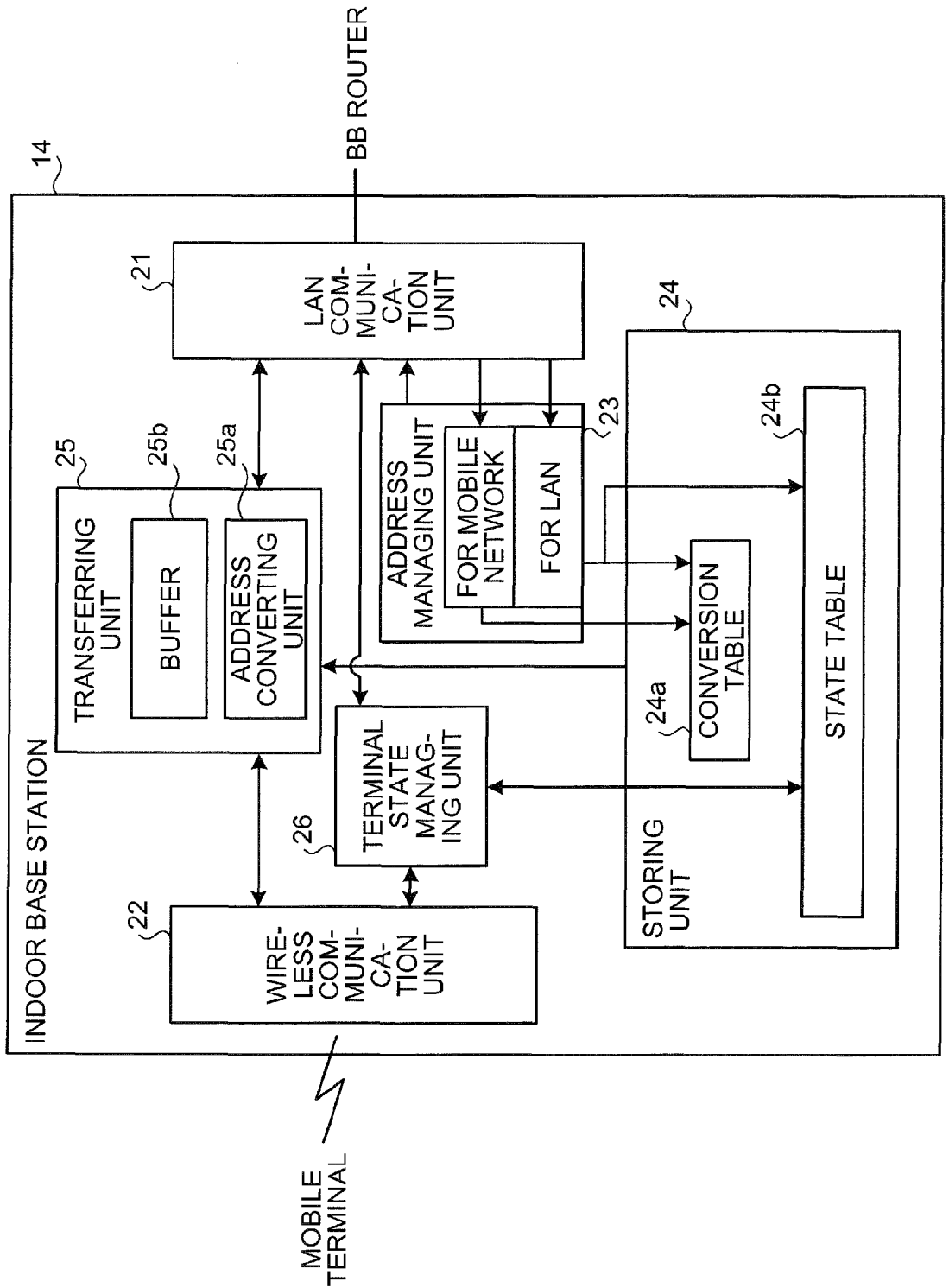
FIG. 2 is a block diagram of an exemplary configuration of an indoor base station depicted in FIG. 1.

FIG. 2 is a block diagram of an exemplary configuration of the indoor base station depicted in FIG. 1. As depicted in FIG. 2, the indoor base station 14 includes a LAN communication unit 21, a wireless communication unit 22, an address managing unit 23, a storing unit 24, a transferring unit 25, and a terminal state managing unit 26. The LAN communication unit 21 is connected to the BB router 13 (see FIG. 1) and communicates with the BB router 13.

The wireless communication unit 22 forms the communication area 16 (see FIG. 1) by emitting an electro-magnetic wave around the wireless communication unit 22 and wirelessly communicates with the mobile terminal 15 (see FIG. 1). The address managing unit 23 obtains the LAN address from the BB router 13 through the LAN communication unit 21 (first obtaining unit). The address managing unit 23 obtains the mobile-network address that is transmitted from the communication apparatus 18 and passes through the BB router 13, through the LAN communication unit 21 (second obtaining unit).

The address managing unit 23 generates a conversion table 24*a* that correlates the obtained LAN address with the mobile-network address, and stores the conversion table 24*a* in the storing unit 24. The address managing unit 23 stores in the storing unit 24, a state table 24*b* storing therein the LAN address of the conversion table 24*a*. The address managing unit 23 may return to the communication apparatus 18 through the LAN communication unit 21, a mobile-network address that becomes unnecessary when the mobile terminal 15 leaves the communication area 16.

The transferring unit 25 transmits to the BB router 13 through the LAN communication unit 21, the IP packet received from the mobile terminal 15 through the wireless communication unit 22. The transferring unit 25 transmits to the mobile terminal 15 through the wireless communication unit 22, the IP packet received from the BB router 13 through the LAN communication unit 21. The transferring unit 25 includes an address converting unit 25*a*. When the destination address of an IP packet received from the BB router 13 is the LAN address assigned to the mobile terminal 15, the converting unit 25*a* converts the destination address of the IP packet into the mobile-network address.

More specifically, the address converting unit 25*a* converts the LAN address of the IP packet into the mobile-network address that is correlated with the LAN address in the conversion table 24*a* stored in the storing unit 24. In this case, the transferring unit 25 outputs to the wireless communication unit 22, the IP packet whose the destination address has been converted by the address converting unit 25*a* into the mobile-network address.

The terminal state managing unit 26 manages information concerning the mobile terminal 15 in the communication area 16. More specifically, the terminal state managing unit 26 detects the entrance of the mobile terminal 15 into the communication area 16. For example, the wireless communication unit 22 continuously transmits identification information concerning the indoor base station 14 to the communication area 16. When the mobile terminal 15 enters the communication area 16, the mobile terminal 15 receives the identification information concerning the indoor base station 14.

When the mobile terminal 15 receives the identification information concerning the indoor base station 14, the mobile terminal 15 transmits a signal such as the location registration request to the indoor base station 14. The terminal state managing unit 26 receives the signal from the mobile terminal 15 through the wireless communication unit 22 and thereby, detects the entrance of the mobile terminal 15 into the communication area 16. When the terminal state managing unit 26 ceases to receive the signal from the mobile terminal 15, the terminal state managing unit 26 detects the leaving of the mobile terminal 15 from the communicating area 16.

The terminal state managing unit 26 manages communication modes of the mobile terminal 15 in the communicating area 16. For example, the mobile terminal 15 transmits a signal indicating the communication mode of the mobile terminal 15 to the indoor base station 14. The terminal state managing unit 26 obtains the signal indicating the communication mode of the mobile terminal 15 transmitted from, for example, an RRC (not depicted) through the LAN communication unit 21 and thereby, identifies the communication mode of the mobile terminal 15.

The terminal state managing unit 26 executes paging through the wireless communication unit 22 and thereby, switches the communication mode of the mobile terminal 15. Alternatively, the terminal state managing unit 26 may issue a request to the RRC and thereby, switch the communication mode of the mobile terminal 15. The terminal state managing unit 26 correlates information concerning the mobile terminal 15 in the communication area 16 with the LAN address of the mobile terminal 15 in the state table 24*b* and stores the information in the storing unit 24.

Figure 3:
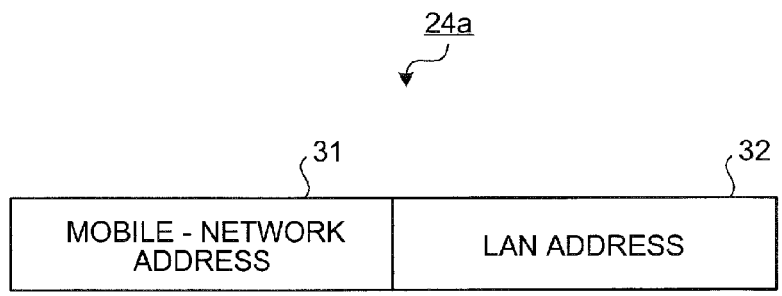
FIG. 3 is a diagram of an example of a conversion table depicted in FIG. 2.

FIG. 3 is a diagram of an example of the conversion table depicted in FIG. 2. As depicted in FIG. 3, a mobile-network address 31 and a LAN address 32 are correlated and stored in the conversion table 24*a* (see FIG. 2) stored in the storing unit 24. The address converting unit 25*a* of the transferring unit 25 converts the destination address of the IP packet whose destination address is the LAN address 32, into the mobile-network address 31 that corresponds to the LAN address 32.

An example of storing the mobile-network address 31 and the LAN address 32 into the conversion table 24*a* has been described with respect to only the mobile terminal 15. However, when a mobile terminal other than the mobile terminal 15 is present in the communication area 16, for each mobile terminal, a combination of a mobile network address 31 and a LAN address 32 is stored in the conversion table 24*a*.

Figure 4:
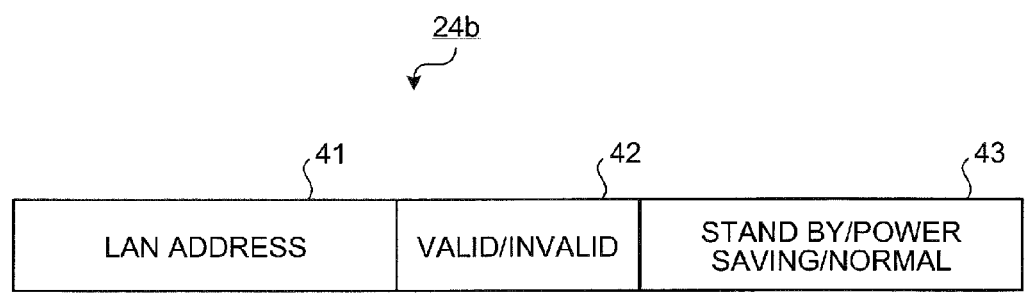
FIG. 4 is a diagram of a state table depicted in FIG. 2.

FIG. 4 is a diagram of the state table depicted in FIG. 2. As depicted in FIG. 4, in the state table 24*b* (see FIG. 2) stored in the storing unit 24, a valid/invalid flag 42 and a communication mode flag 43 are stored correlated with a LAN address 41 that is assigned to the mobile terminal 15. The valid/invalid flag 42 is a flag that indicates whether the LAN address 41 assigned to the mobile terminal 15 is valid.

When the address managing unit 23 assigns the LAN address 41 to the mobile terminal 15, the terminal state managing unit 26 sets the valid/invalid flag 42 that corresponds to the LAN address 41 assigned to the mobile terminal 15, to "valid". When the terminal state managing unit 26 detects that the mobile terminal 15 leaves the communication area 16, the terminal state managing unit 26 sets the valid/invalid flag 42 that corresponds to the LAN address 41 assigned to the mobile terminal 15, to "invalid".

The terminal state managing unit 26 records the detected communication mode of the mobile terminal 15 in the communication mode flag 43 that corresponds to the LAN address 41. It is assumed herein that the communication modes include three that are "stand by", "power saving", and "normal". The "stand by" and the "power saving" modes are waiting states and communication modes that, as far as remaining as is, enable no reception of data from the wireless communication unit 22. The "normal" mode is a communication mode that enables reception of data from the wireless communication unit 22.

Figure 5:
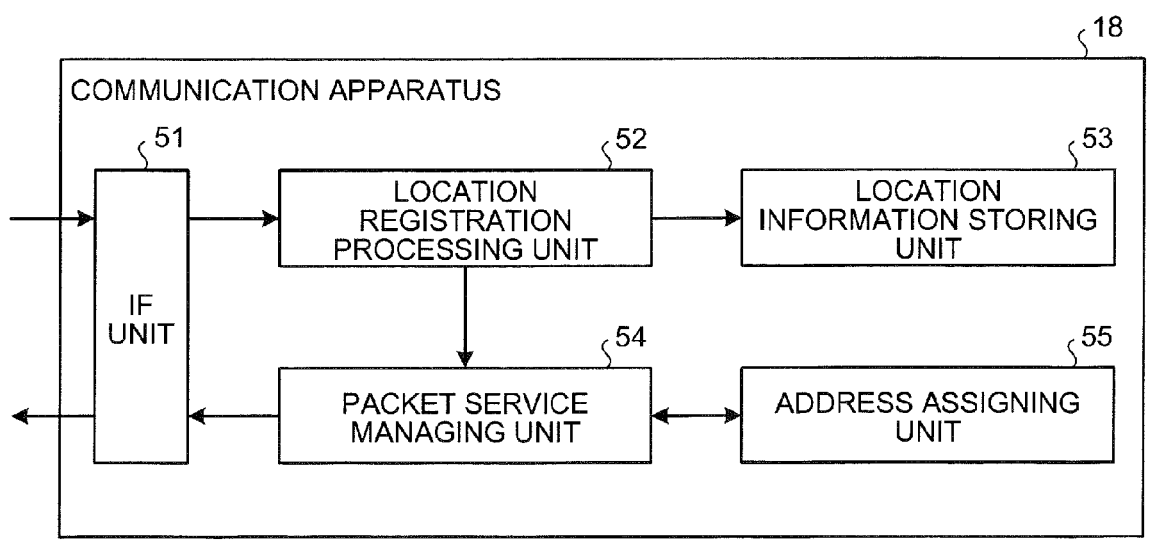
FIG. 5 is a block diagram of an exemplary configuration of a communicating apparatus depicted in FIG. 1.

FIG. 5 is a block diagram of an exemplary configuration of the communicating apparatus depicted in FIG. 1. As depicted in FIG. 5, the communication apparatus 18 includes an IF unit 51, a location registration processing unit 52, a location information storing unit 53, a packet service managing unit 54, and an address assigning unit 55. The IF unit 51 is connected to and communicates with the BB router 13.

The location registration processing unit 52 receives, through the IF unit 51, a location registration request transmitted from the indoor base station 14 through the BB router 13, and the location registration processing unit 52 executes location registration of the mobile terminal 15 in response to the location registration request received. More specifically, the location registration processing unit 52 causes the location information storing unit 53 to store therein information indicating that the mobile terminal 15 is present in the communication area 16. When the location registration is completed, the location registration processing unit 52 notifies the packet service managing unit 54 of the completion of registration.

When notification of the completion of the registration is output from the location registration processing unit 52, the packet service managing unit 54 invokes the address assigning unit 55 and causes the address assigning unit 55 to assign a mobile-network address to the mobile terminal 15. The packet service managing unit 54 transmits the mobile-network address obtained from the address assigning unit 55, through the IF unit 51.

The mobile-network address transmitted from the packet service managing unit 54 is received by the mobile terminal 15 through the BB router 13 and the indoor base station 14. In response to the invocation of the packet service managing unit 54, the address assigning unit 55 assigns the mobile-network address, and the address assigning unit 55 outputs the address to the packet service managing unit 54. The address assigning unit 55 is, for example, a DHCP.

FIG. 6 is a flowchart of an exemplary conversion-table generation operation executed by the indoor base station. The address managing unit 23 obtains multiple LAN addresses from the BB router 13 through the LAN communication unit 21, and pools the LAN addresses obtained (step S601). The terminal state managing unit 26 determines whether the mobile terminal 15 has entered the communication area 16 (step S602), and the terminal state managing unit 26 waits for the mobile terminal 15 to enter the communication area 16 (step S602: NO).

If the mobile terminal 15 has entered the communication area 16 at step S602 (step S602: YES), the terminal state managing unit 26 confirms that the location registration of the mobile terminal 15 by the communication apparatus 18 has been executed (step S603). At step S603, the terminal state managing unit 26 confirms that the location registration of the mobile terminal 15 has been executed, using, for example, the notification from the communication apparatus 18. In this example, it is assumed that the communication mode of the mobile terminal 15 is "normal".

As a result of the location registration of the mobile terminal 15, the address managing unit 23 obtains the mobile-network address that is assigned by the communication apparatus 18, through the LAN communication unit 21 (step S604). The terminal state managing unit 26 assigns one of the LAN addresses obtained at step S601, to the mobile terminal 15 (step S605).

The address managing unit 23 generates the conversion table 24a for the mobile-network address obtained at step S604 and the LAN address assigned to the mobile terminal 15 at step S605 (step S606). At step S606, the address managing unit 23 causes the storing unit 24 to store therein the conversion table generated 24a.

The terminal state managing unit 26 generates the state table 24b concerning the mobile terminal 15 (step S607). More specifically, the terminal state managing unit 26 causes the storing unit 24 to store therein the state table 24b in which the valid/invalid flag 42 and the communication mode flag 43 that respectively correspond to the LAN address 41 assigned to the mobile terminal 15 at step S605 are respectively set to "valid" and "normal". Thereby, preparation is completed for transferring, to the mobile terminal 15 and using the indoor base station 14, the IP packet addressed to the mobile terminal 15 and transmitted from the PC 17.

The terminal state managing unit 26 determines whether the communication mode of the mobile terminal 15 has switched (step S608). When the communication mode of the mobile terminal 15 has not switched (step S608: NO), the process advances to step S610 and continues. When the communication mode of the mobile terminal 15 has switched (step S608: YES), the communication flag 43 in the conversion table 24a is changed from "normal" to the communication mode after the switching (step S609).

The terminal state managing unit 26 determines whether the mobile terminal 15 has left the communication area 16 (step S610). When the mobile terminal 15 has not left the communication area 16 (step S610: NO), the process returns to step S608 and continues. When the mobile terminal 15 has left the communication area 16 (step S610: YES), the terminal state managing unit 26 sets the valid/invalid flag 42 in the conversion table 24a to "invalid" (step S611).

The address managing unit 23 causes the storing unit 24 to correlate the mobile-network address and the LAN address stored in the conversion table 24a with an international mobile subscriber identity (IMSI) of the mobile terminal 15, the IMSI being a subscriber identifier, and to further store the addresses (step S612), and a series of the process comes to an end.

Figure 7:
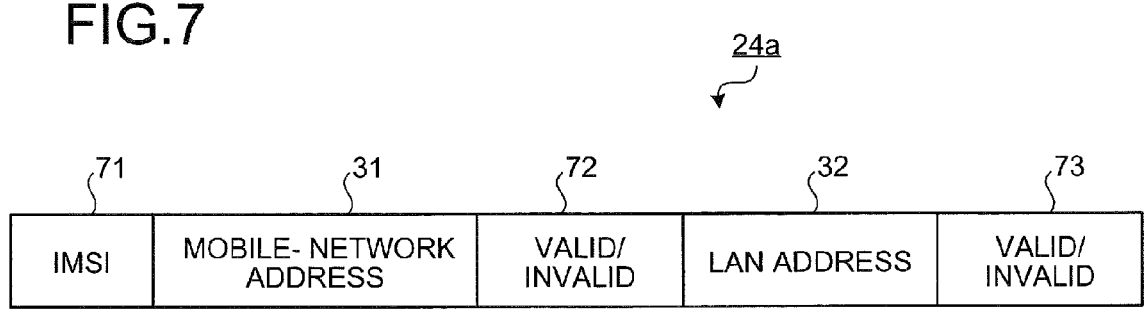
FIG. 7 is a diagram of an exemplary conversion table generated according to the generation operation depicted in FIG. 6.

FIG. 7 is a diagram of an exemplary conversion table generated according to the generation operation depicted in FIG. 6. When the terminal state managing unit 26 is to store the mobile-network address and the LAN address after the mobile terminal 15 leaves the communication area 16 (see FIG. 6), the address managing unit 23 generates the conversion table 24a as depicted in FIG. 7 and causes the storing unit 24 to store the conversion table 24a therein.

As depicted in FIG. 7, the conversion table 24a stores therein the mobile-network address 31 and the LAN address 32 correlated with an IMSI 71 of the mobile terminal 15. The conversion table 24a further stores therein the valid/invalid flag 72 indicating whether the mobile-network address 31 is valid and a valid/invalid flag 73 indicating whether the LAN address 32 is valid.

When both the mobile-network address and the LAN address after the mobile terminal 15 leaves the communication area 16, the address managing unit 23 sets both of the valid/invalid flags 72 and 73 to "valid". Alternatively, the mobile-network address may be returned to the communication apparatus 18 at an arbitrary timing after the mobile terminal 15 leaves the communication area 16. In this case, the address managing unit 23 sets the valid/invalid flag 72 to "invalid" after the return of the mobile-network address.

When the mobile terminal 15 or another mobile terminal enters the communication area 16 after the mobile terminal 15 leaves the communication area 16, if the valid/invalid flag 72 indicates "valid", the address managing unit 23 obtains the mobile-network address 31 in the conversion table 24a instead of obtaining a new mobile-network address from the communication apparatus 18.

When the mobile terminal 15 or another mobile terminal enters the communication area 16 after the mobile terminal 15 leaves the communication area 16, if the valid/invalid flag 72 indicates "invalid", the address managing unit 23 obtains a new mobile-network address assigned by the communication apparatus 18 and generates the conversion table 24a.

Figure 8:
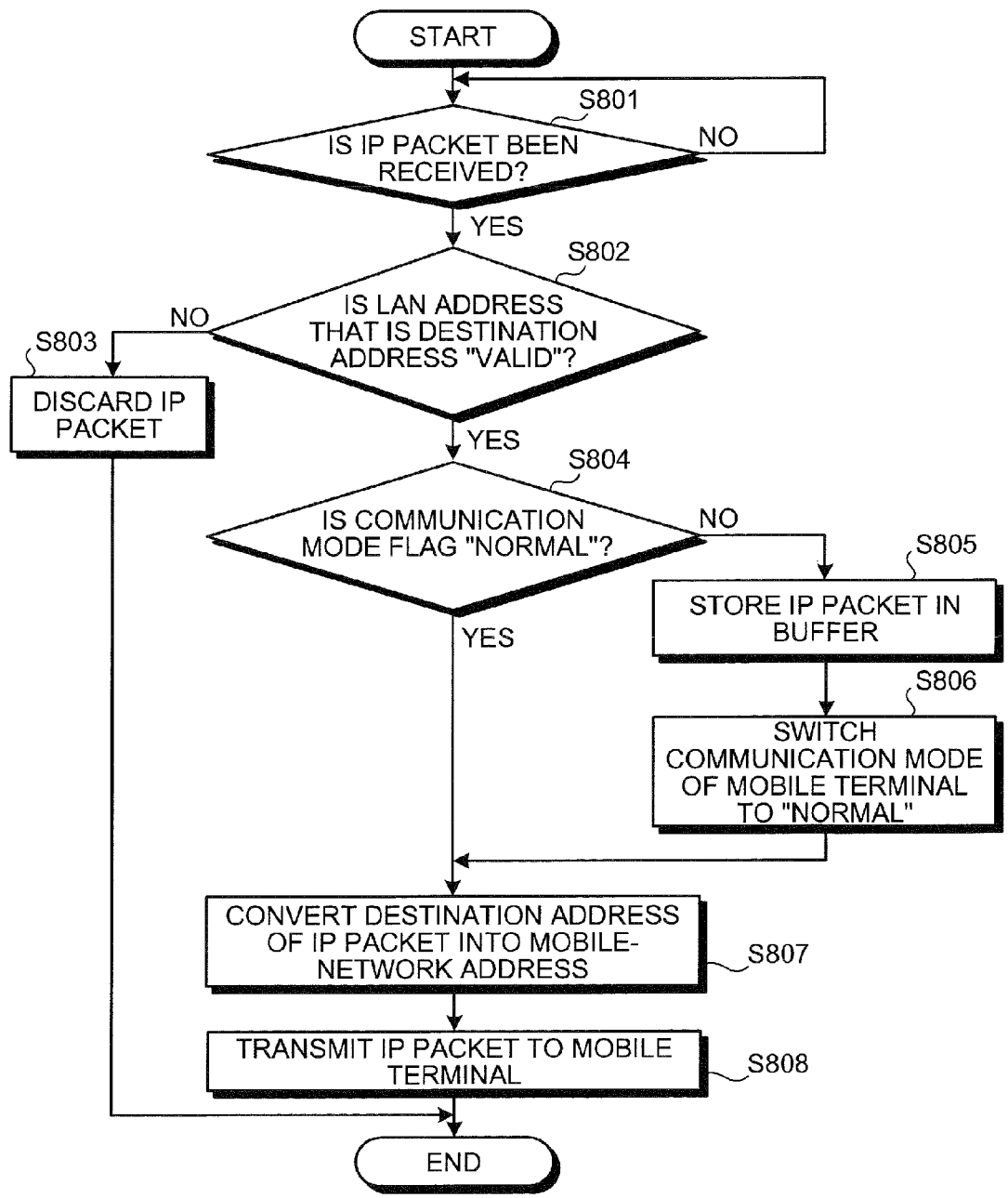
FIG. 8 is a flowchart of an exemplary packet transfer operation by the indoor base station.

FIG. 8 is a flowchart of an exemplary packet transfer operation by the indoor base station. The indoor base station 14 repeatedly executes the following packet transfer operation during the looping from steps S608 to S610 of FIG. 6. The transferring unit 25 determines whether the LAN communication unit 21 has received an IP packet transmitted from the PC 17 (step S801), waiting occurs for an IP packet to be received (step S801: NO).

When an IP packet is received at step S801 (step S801: YES), in the state table 24b, whether the valid/invalid flag 42 for the LAN address 41 corresponding to the destination address of the received IP packet indicates "valid" is determined (step S802). When the valid/invalid flag 42 indicates "invalid" (step S802: NO), the IP packet received at step S801 is discarded (step S803) and a series of the process comes to an end.

When the valid/invalid flag 42 indicates "valid" at step S802 (step S802: YES), in the state table 24b, whether the communication mode flag 43 for the LAN address 41 corresponding to the destination address of the received IP packet indicates "normal" is determined (step S804). When the communication mode flag 43 indicates "normal" (step S804: YES), the process advances to step S807 and continues.

When the communication mode flag 43 does not indicate "normal" ("power saving" or "stand by") at step S804 (step S804: NO), the IP packet received at step S801 is stored in a buffer 25b (step S805) and the communication mode of the mobile terminal 15 is switched to "normal" (step S806).

The address converting unit 25a converts the destination address of the IP packet received at step S801 into the mobile-network address 31 that is correlated with the LAN address 32 in the conversion table 24a (step S807). The wireless communication unit 22 transmits to the mobile terminal 15, the IP packet whose destination address has been converted into the mobile-network address 31 at step S807 (step S808) and a series of the process comes to an end.

Figure 9:
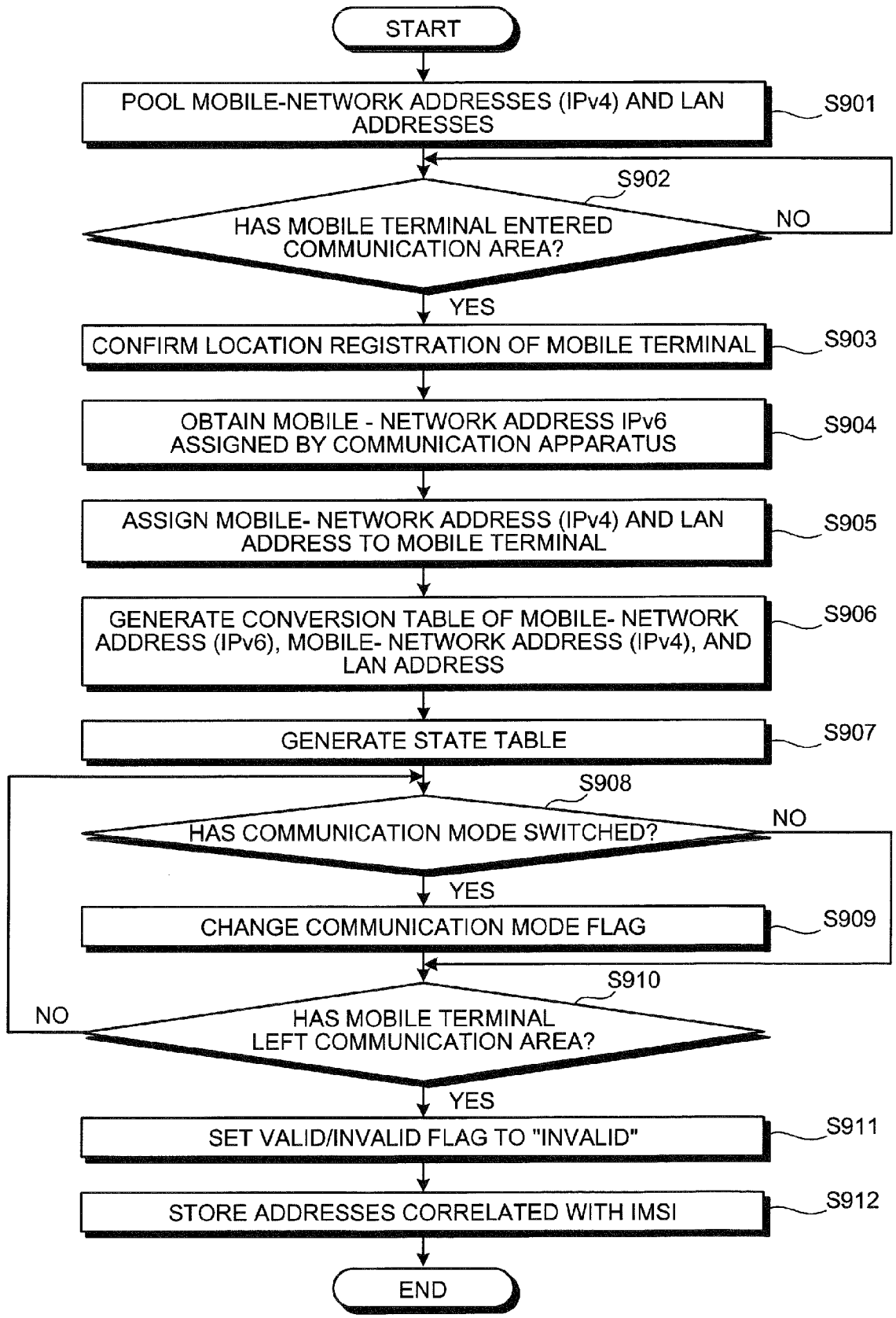
FIG. 9 is a flowchart of another exemplary conversion-table generation operation by the indoor base station.

FIG. 9 is a flowchart of another exemplary conversion-table generation operation by the indoor base station. Steps S901 to S912 depicted in FIG. 9 are substantially identical to steps S601 to S612 (see FIG. 6); hence, only portions different from steps S601 to S612 will be described. An example where the mobile-network address used in the mobile communication network 12 is for "IPv6" and the mobile-network address that the mobile terminal 15 supports is for "IPv4" will be described.

At step S901, the address managing unit 23 obtains multiple IPv4 addresses for the mobile network from a DHCP in the LAN 11, obtains multiple LAN addresses from the BB router 13 through the LAN communication unit 21, and pools the IPv4 mobile-network addresses and the LAN addresses obtained.

At step S905, the terminal state managing unit 26 assigns, to the mobile terminal 15, one of the IPv4 mobile-network addresses obtained at step S901 and one of the LAN addresses obtained at step S901. At step S906, as the result of the location registration of the mobile terminal 15, the address managing unit 23 obtains, through the LAN communication unit 21, the IPv6 mobile-network address assigned by the communication apparatus 18.

At step S906, the address managing unit 23 generates the conversion table 24a for the IPv6 mobile-network address obtained at step S904, the IPv4 mobile-network address assigned to the mobile terminal 15 at step S905, and the LAN address assigned to the mobile terminal 15 at step S905.

Figure 10:
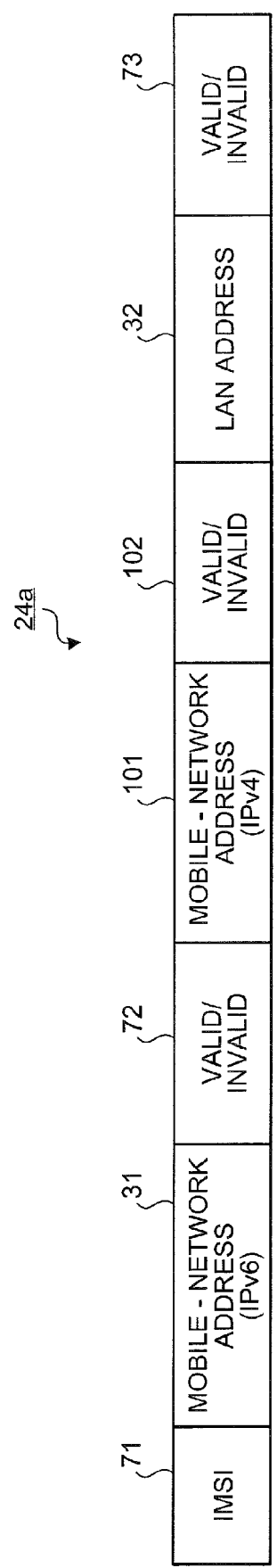
FIG. 10 is a diagram of the conversion table generated according to the generation operation depicted in FIG. 9.

FIG. 10 is a diagram of the conversion table generated according to the generation operation depicted in FIG. 9. In FIG. 10, components identical to those depicted in FIG. 7 are given the same reference numerals respectively given in FIG. 7 and description thereof is omitted. At step S906 of the generation operation depicted in FIG. 9, for example, the conversion table 24a depicted in FIG. 10 is generated. The conversion table 24a is stored in the storing unit 24.

In the conversion table 24a, an IPv4 mobile-network address 101 is correlated and stored in addition to the IMSI 71, the IPv6 mobile-network address 31, and the LAN address 32. A valid/invalid flag 75 that indicates whether the IPv4 mobile-network address 101 is valid is also stored. The packet transfer operation by the indoor base station 14 in this example is substantially identical to that depicted in FIG. 8.

In this example, at step S807 depicted in FIG. 8, the address converting unit 25a converts the destination address of the IP packet received at step S801 into the mobile-network IPv4 address 101 that is correlated with the original LAN address 32 in the conversion table 24a (see FIG. 10). Thus, the IP packet transmitted from the PC 17 can be transferred to the mobile terminal 15 even when the mobile-network address used in the mobile communication network 12 is for IPv6 and the mobile-network address that the mobile terminal supports is for IPv4.

Figure 11:
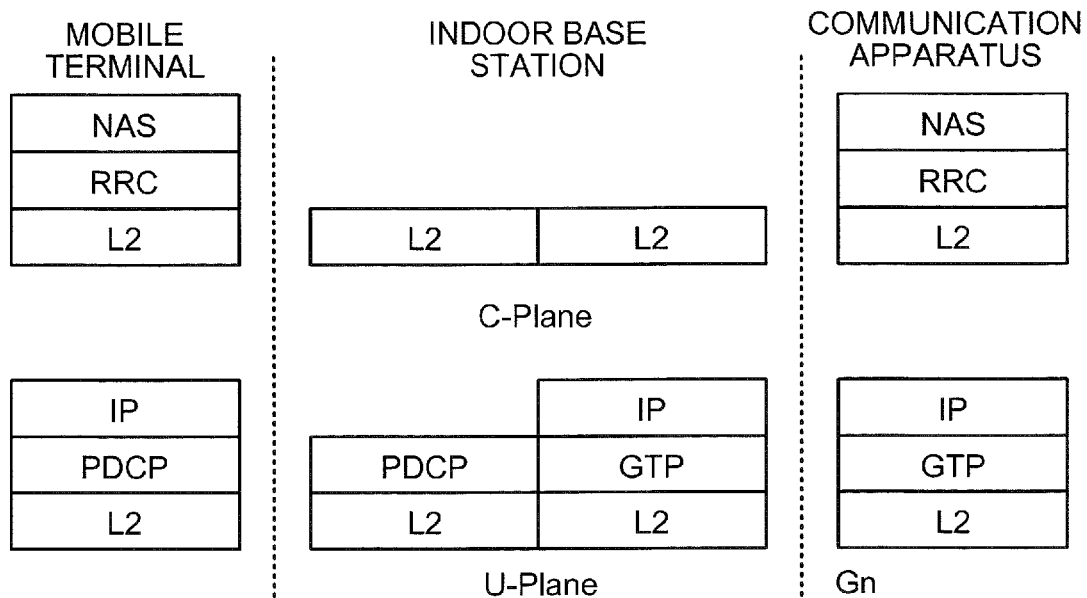
FIG. 11 is a diagram of a first exemplary functional configuration of the communication system.
Figure 12:
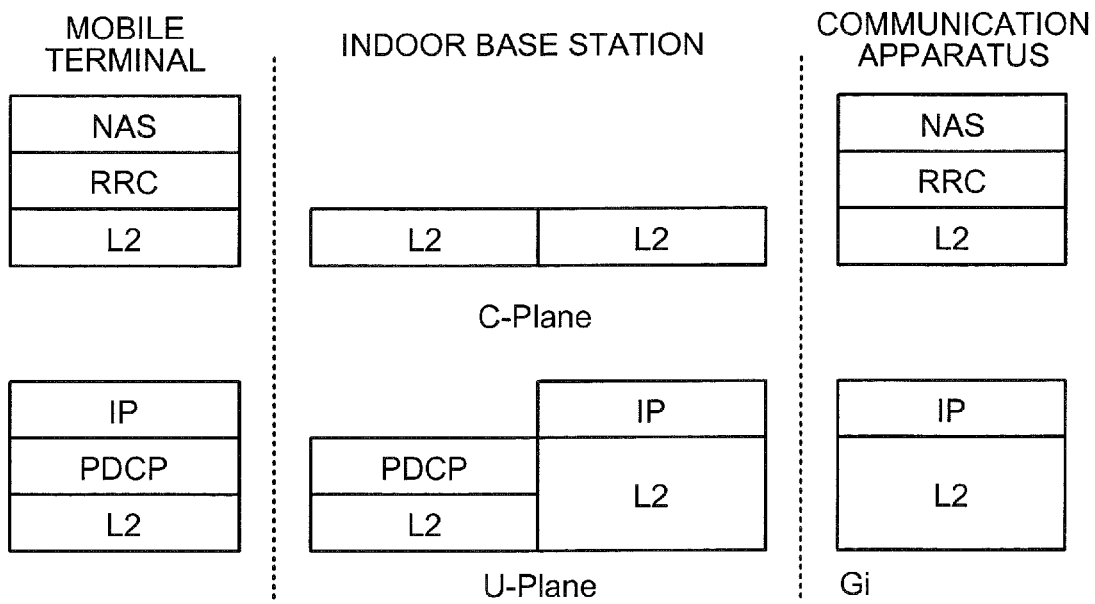
FIG. 12 is another diagram of the first exemplary functional configuration of the communication system.

FIG. 11 is a diagram of a first exemplary functional configuration of the communication system. FIG. 12 is another diagram of the first exemplary functional configuration of the communication system. FIGS. 11 and 12 depict protocol stacks of a control-plane (C-Plane), which is a control data layer, and a user-plane (U-Plane), which is a user data layer, respectively formed when radio resource control (RRC) termination is executed by the communication apparatus 18.

The first exemplary functional configurations respectively depicted in FIGS. 11 and 12 differ in the respect of whether the communication apparatus 18 has a GPRS tunneling protocol (GTP) function in the U-Plane. In the first exemplary functional configuration depicted in FIG. 11, the communication apparatus 18 has the GTP function in the U-Plane and the communication apparatus 18 terminates the GTP. In the first exemplary functional configuration depicted in FIG. 12, the communication apparatus 18 has no GTP function and the communication apparatus 18 does not terminate GTP.

"L2" denotes a Layer2 protocol. "PDCP" denotes a packet data control protocol. The indoor base station 14 has a function of a femtoAP such as a Node B Application Part (NBAP), a W-CDMA, and a PIIY/Medium Access Control (MAC).

The indoor base station 14 has at least a portion of the functions incorporated to a base station control apparatus (radio network controller (RNC)) or an apparatus at a higher level than that of the base station control apparatus such as a serving GPRS support node (SGSN), and a gateway GPRS support node (GGSN).

To return the data using the indoor base station 14, the indoor base station 14 has a function of terminating a protocol as the mobile communication network 12 necessary for a data path and a function of invoking the mobile terminal 15 due to a request from the PC 17. The indoor base station 14 mainly has functions such as the RNC and the SGSN/GGSN.

In the first exemplary functional configuration depicted in FIG. 11, to utilize the packet service provided by the mobile communication network 12, the GTP tunnel provided by the mobile communication network 12 can be utilized. Therefore, the mobile terminal 15 can establish a communication path to the mobile communication network 12 using the GTP tunnel without use of the Internet.

In the first exemplary functional configuration depicted in FIG. 12, because the data is returned by the indoor base station 14, a Gi interface may be provided by, for example, executing the termination of the GTP in the indoor base station 14. A "Gi interface" is a connecting point of a GGSN (relaying packet switching machine) under the 3GPP and a packet data network (PDN).

Thus, the mobile terminal 15 can communicate data with the PC 17 without passing the data through the mobile communication network 12. In the first exemplary functional configuration, the configuration is switched to the first exemplary functional configuration depicted in FIG. 11 when the mobile terminal 15 executes data communication with the mobile communication network 12, and the configuration is switched to the first exemplary functional configuration depicted in FIG. 12 when the mobile terminal 15 executes data communication with the PC 17. Thus, the mobile terminal 15 can execute data communication with both the mobile communication network 12 and the PC 17.

By terminating a paging function that the RRC has by the communication apparatus 18, the mobile terminal 15 can be invoked by a request from the PC 17. In this case, for example, when the indoor base station 14 receives, from the PC 17, an IP packet that is addressed to the mobile terminal 15, the indoor base station 14 requests the communication apparatus 18 to issue paging.

Figure 13:
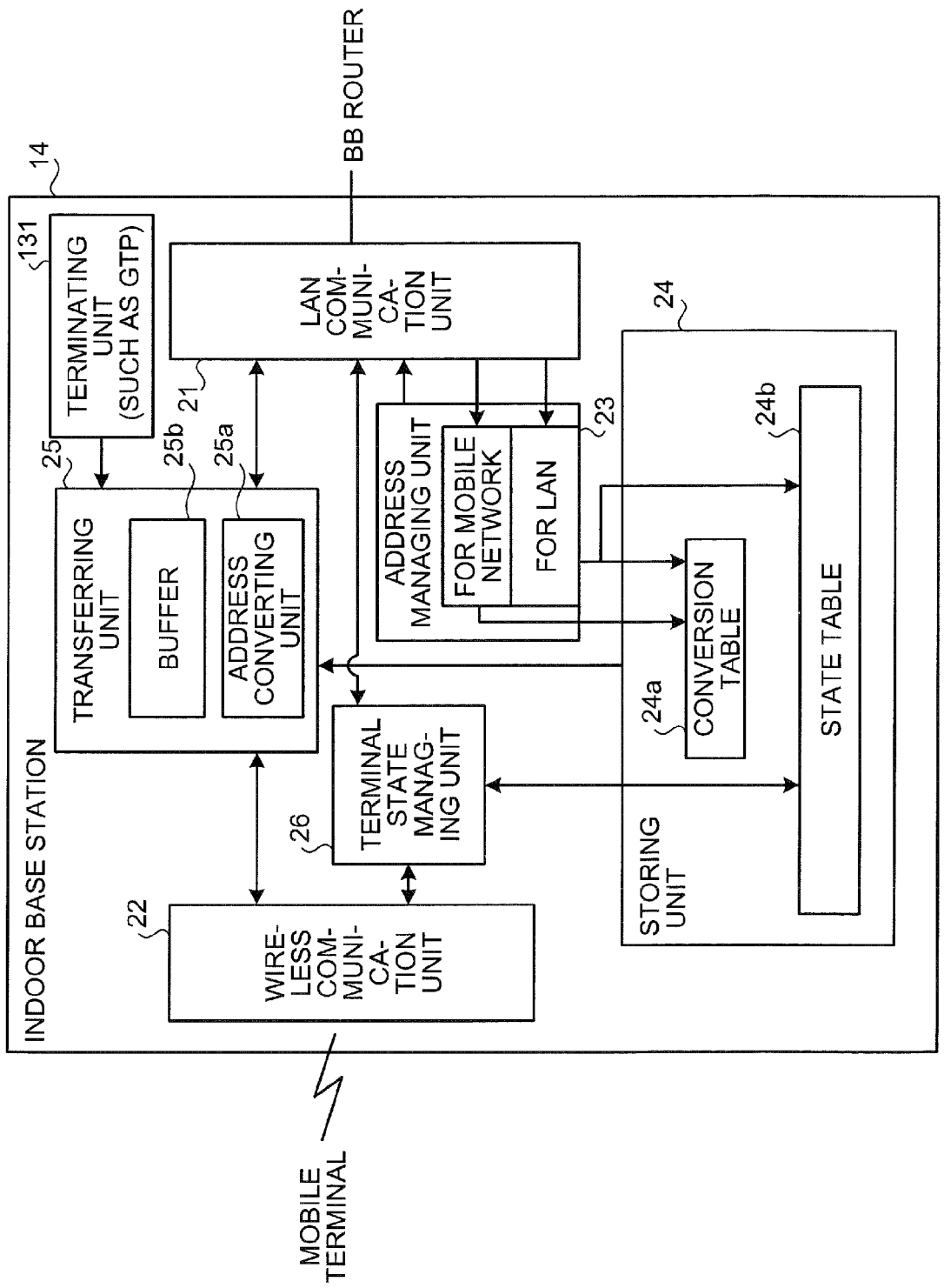
FIG. 13 is a block diagram of a configuration of the indoor base station in the first exemplary functional configuration.

FIG. 13 is a block diagram of a configuration of the indoor base station in the first exemplary functional configuration. In FIG. 13, components identical to those depicted in FIG. 2 are given the same reference numerals respectively given in FIG.

2 and the description thereof will be omitted. As depicted in FIG. 13, the indoor base station 14 includes a terminating unit 131 in addition to the components depicted in FIG. 2.

The wireless communication unit 22 executes a protocol concerning wireless communication (such as the 3GPP: MAC/RLC/PDCP). The LAN communication unit 21 executes a protocol concerning wired communication (such as IEEE802). The terminal state managing unit 26 manages the state of the mobile terminal 15 by obtaining the RRC state of the mobile terminal 15 from the RRC incorporated in the communication apparatus 18.

The terminal state managing unit 26 determines whether a mode of the mobile terminal 15 is Cell_DCH (power consumption mode), Cell_HSDSCH (ordinary mode), Cell_PCH (power saving mode), etc. to determine the state of the mobile terminal 15. The terminating unit 131 controls the transferring unit 25 and executes a protocol process concerning packet transmission under the 3GPP, such as the GTP. The terminating unit 131 provides the Gi interface by terminating the GTP when the mobile terminal 15 executes data communication with the PC 17.

When the transferring unit 25 receives the IP packet through the LAN communication unit 21, the transferring unit 25 determines whether the valid/invalid flag 42 indicates "valid" in the state table 24b for the LAN address of the received IP packet. When the valid/invalid flag 42 indicates "valid", the transferring unit 25 refers to the communication mode flag 43 in the state table 24b for the LAN address of the received IP packet.

When the communication mode flag 43 referred to indicates "power saving", the transferring unit 25 stores the received IP packet in the buffer 25b and requests the terminal state managing unit 26 to switch the communication mode of the mobile terminal 15 from "power saving" to "normal". In response, the terminal state managing unit 26 transmits, to the communication apparatus 18 through the LAN communication unit 21, a signal to request a switching of the communication mode of the mobile terminal 15 to "normal".

Consequently, the communication apparatus 18 transmits RRC paging to the mobile terminal 15 through the BB router 13 and the indoor base station 14. When the mobile terminal 15 receives the RRC paging, the mobile terminal 15 switches the communication mode thereof from "power saving" to "normal". After transmitting the RRC paging to the mobile terminal 15, the communication apparatus 18 transmits, to the indoor base station 14 through the BB router 13, a signal indicating that the communication mode of the mobile terminal 15 has been switched to "normal".

When the terminal state managing unit 26 receives, through the LAN communication unit 21, the signal indicating that the communication mode of the mobile terminal 15 has been switched to "normal", the terminal state managing unit 26 changes the communication mode flag 43 of the state table 24b from "power saving" to "normal". When the transferring unit 25 receives, through the LAN communication unit 21, the signal indicating that the communication mode of the mobile terminal 15 has been switched to "normal", the transferring unit 25 converts the destination address of the IP packet stored in the buffer 25b from the LAN address to the mobile-network address according to the conversion table 24a.

The transferring unit 25 transmits the IP packet, whose destination address has been converted, to the mobile terminal 15 through the wireless communication unit 22. Thus, the IP packet transmitted from the PC 17 can be transferred to the mobile terminal 15. An example where an IP packet is transmitted from the mobile terminal 15 to the PC 17 will be described. In this example, the mobile terminal 15 transmits the IP packet using the LAN address assigned to the PC 17 as the destination address.

Further, in this example, the transmission origin of the IP packet is the mobile-network address of the mobile terminal 15. The transferring unit 25 receives the IP packet transmitted from the mobile terminal 15, through the wireless communication unit 22. The transferring unit 25 converts the transmission origin of the received IP packet from the mobile-network address into the LAN address according to the conversion table 24a.

The transferring unit 25 transmits the IP packet, whose transmission origin has been converted, to the PC 17 through the LAN communication unit 21. Thus, the transmission origin of the IP packet received by the PC 17 is the LAN address (of the mobile terminal 15) that the PC 17 knows and the PC 17 can conventionally receive the IP packet transmitted from the mobile terminal 15.

Figure 14:
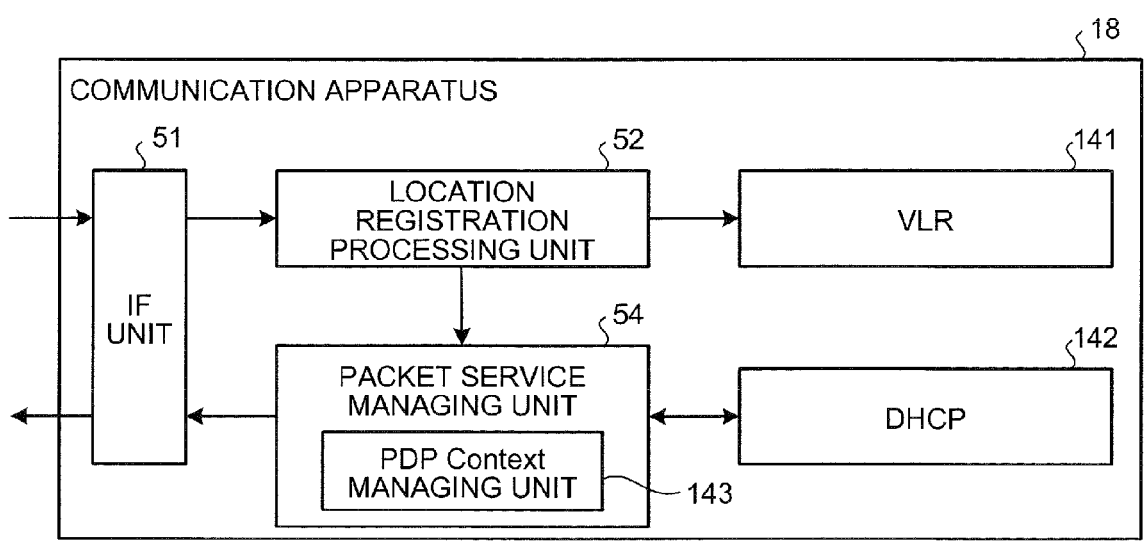
FIG. 14 is a block diagram of a configuration of the communicating apparatus in the first exemplary functional configuration.

FIG. 14 is a block diagram of a configuration of the communicating apparatus in the first exemplary functional configuration. In FIG. 14, components identical to those depicted in FIG. 5 are given the same reference numerals respectively given in FIG. 5 and description thereof will be omitted. As depicted in FIG. 14, the communication apparatus 18 includes a visitor location register (VLR) 141 as the location information storing unit 53 (see FIG. 5). The communication apparatus 18 includes a DHCP 142 as the address assigning unit 55 (see FIG. 5).

The packet service managing unit 54 includes a PDP Context managing unit 143. The PDP Context managing unit 143 executes a packet arrival process to activate packet-related information (PDP). Although a configuration including the VLR 141 and the DHCP 142 that are provided on the communication apparatus 18 has been described, the VLR 141 and the DHCP 142 may be provided externally of the communication apparatus 18.

Figure 15:
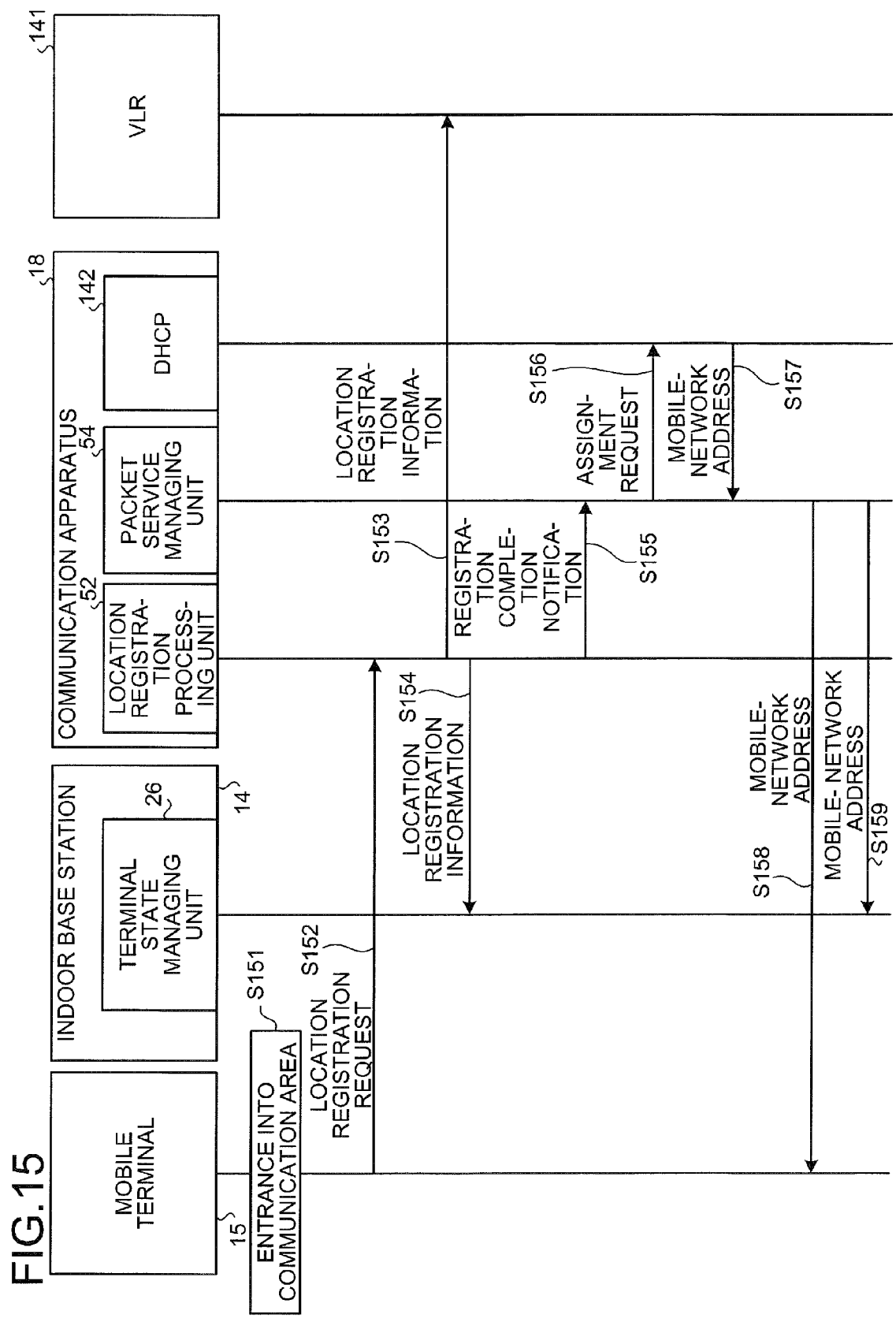
FIG. 15 is a sequence chart of an exemplary location registration operation of the communication system in the first exemplary functional configuration.

FIG. 15 is a sequence chart of an exemplary location registration operation of the communication system in the first exemplary functional configuration. In this example, the VLR 141 is provided externally of the communication apparatus 18. When the mobile terminal 15 enters the communication area 16 (step S151), the mobile terminal 15 transmits the location registration request to the communication apparatus 18 through the indoor base station 14 (step S152).

The location registration processing unit 52 of the communication apparatus 18 executes the location registration of the mobile terminal 15 and transmits location registration information that indicates that the mobile terminal 15 is present in the communication area 16, to the VLR 141 (step S153). The VLR 141 stores therein the location registration information from the location registration processing unit 52. The location registration processing unit 52 further transmits the location registration information to the indoor base station 14 (step S154). The terminal state managing unit 26 of the indoor base station 14 learns that the mobile terminal 15 is present in the communication area 16, based on the location registration information from the location registration processing unit 52.

When the location registration is completed, the location registration processing unit 52 notifies the packet service managing unit 54 of completion of the location registration (step S155). The packet service managing unit 54 outputs to the DHCP 142 an assignment request that requests the mobile-network address to be assigned (step S156). The DHCP 142 outputs the mobile-network address to be assigned to the mobile terminal 15 to the packet service managing unit 54 (step S157).

The packet service managing unit 54 transmits the mobile-network address output at step S157 to the mobile terminal 15 through the indoor base station 14 (step S158). The packet service managing unit 54 further transmits the mobile-network address output at step S157 to the indoor base station 14 (step S159), and a series of the process comes to an end.

Figure 16:
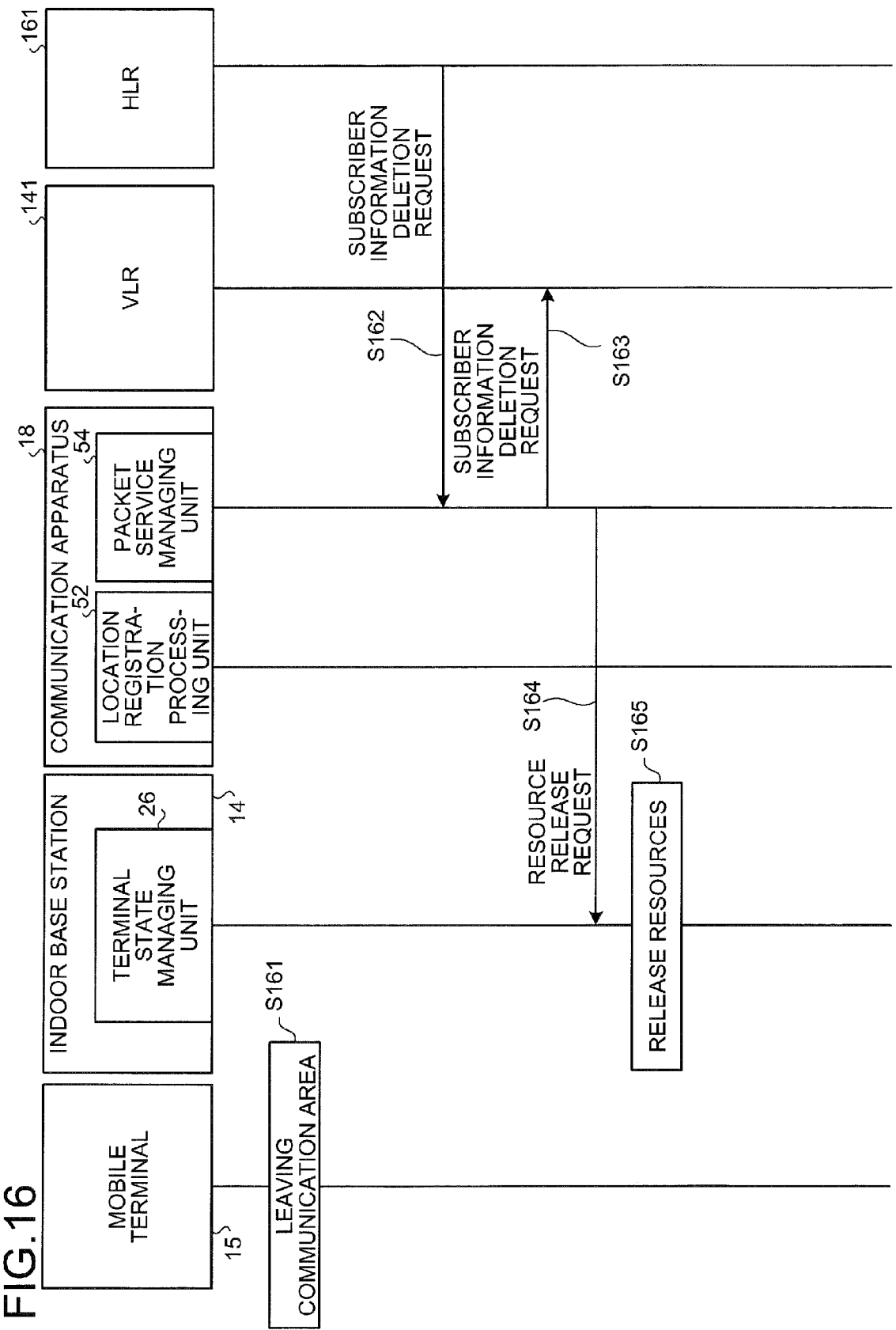
FIG. 16 is a sequence chart of a location registration cancellation operation of the communication system in the first exemplary functional configuration.

FIG. 16 is a sequence chart of a location registration cancellation operation of the communication system in the first exemplary functional configuration. In this example, the VLR 141 is provided externally of the communication apparatus 18. When the mobile terminal 15 leaves the communication area 16 (step S161), a home location register (HLR) 160 transmits a subscriber information deletion request to the communication apparatus 18 (step S162).

The subscriber information deletion request is a signal that requests deletion of the location registration information of the mobile terminal 15. The packet service managing unit 54 of the communication apparatus 18 transmits the subscriber information deletion request to the VLR 141 (step S163). Thus, the VLR 141 deletes the location registration information (of the mobile terminal 15) that the VLR 141 has stored therein. The packet service managing unit 54 transmits a resource release request to the indoor base station 14 (step S164).

The resource release request is a signal that requests release of the resources allocated to the processing concerning the mobile terminal 15. The terminal state managing unit 26 of the indoor base station 14 releases the resources allocated to the processing concerning the mobile terminal 15 (step S165), and a series of the process comes to an end. At this time, the terminal state managing unit 26 may release the resources or may keep storing the mobile-network address and the LAN address in the storing unit 24.

Figure 17:
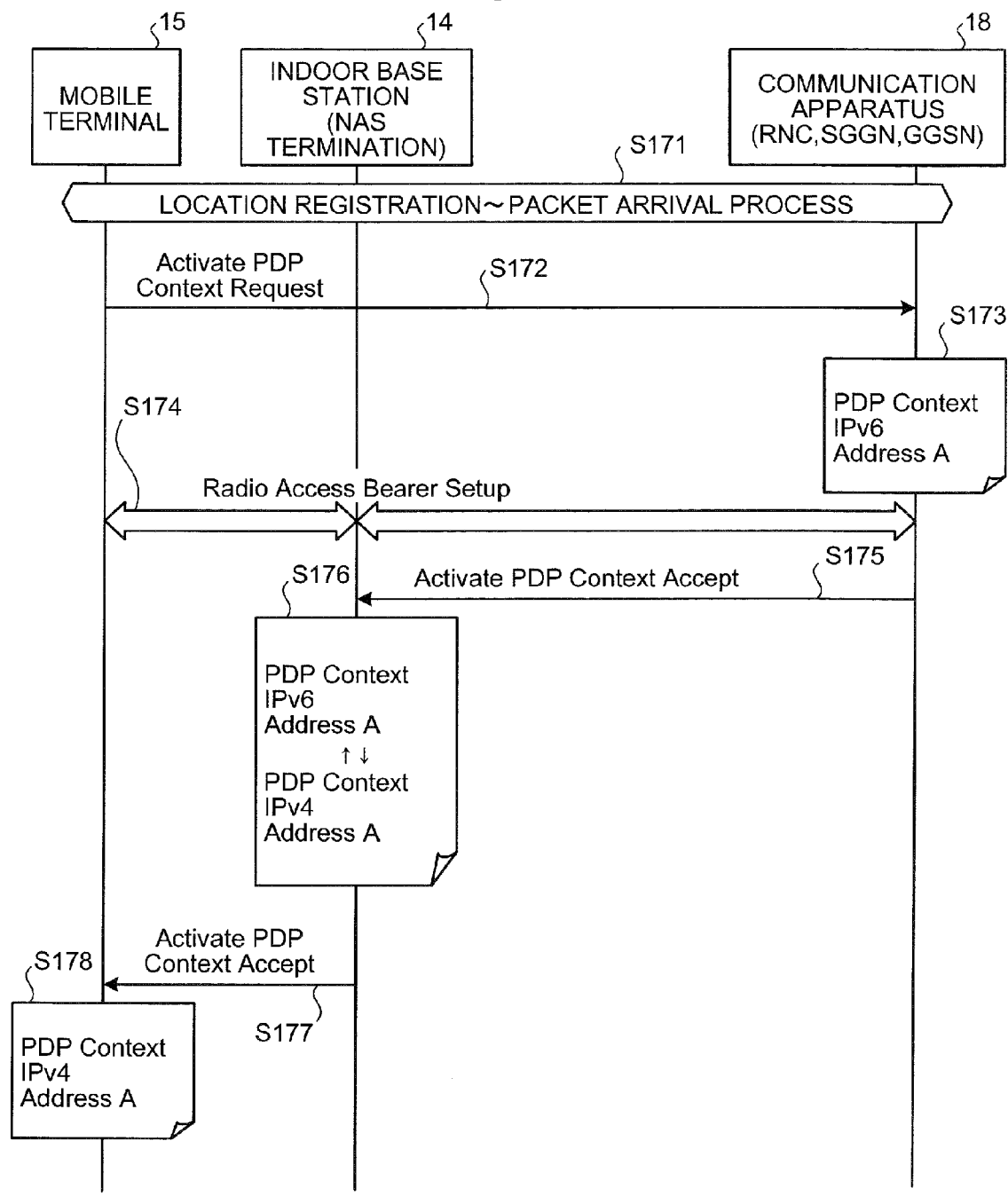
FIG. 17 is a sequence chart of a generation operation for the 3GPP Context in the first exemplary functional configuration.

FIG. 17 is a sequence chart of a generation operation for the 3GPP Context in the first exemplary functional configuration. In FIG. 17, an example where the first exemplary functional configuration is applied to a generation sequence of the PDP Context (Packet Data Protocol Context) in the 3GPP (see 3GPP TS23.060) will be described.

In the first exemplary functional configuration, no protocol that terminates a message, from the communication apparatus 18, notifying the mobile terminal 15 of the mobile-network address is implemented in the indoor base station 14. Therefore, the indoor base station 14 has a function of checking the PDP Context and correcting a portion that is the mobile-network address. The mobile terminal 15, the indoor base station 14, and the communication apparatus 18 execute the location registration and the packet arrival process (step S171).

The mobile terminal 15 transmits a connection request message (Activate PDP Context Request) to the communication apparatus 18 (step S172). The communication apparatus 18 generates PDP Context that has an IPv6 mobile-network address (Address "A") (step S173).

The mobile terminal 15, the indoor base station 14, and the communication apparatus 18 mutually establish communication paths (Radio Access Bearer Setup) (step S174). The communication apparatus 18 transmits the PDP Context generated at step S173 as a connection permission message (Activate PDP Context Accept), to the indoor base station 14 (step S175).

The indoor base station 14 checks the connection permission message transmitted at step S175 and generates the conversion table 24a that includes the IPv6 mobile-network address (Address "A") stored in the connection permission message and the IPv4 mobile-network address (Address "A") pooled in advance (step S176).

The indoor base station 14 transmits the IPv4 mobile-network address (Address "A") used in generating the conversion table 24a at step S176 to the mobile terminal 15 using the connection permission message (Activate PDP Context Accept) (step S177). The mobile terminal 15 sets the IPv4 mobile-network address (Address "A") stored in the connection permission message transmitted at step S177 as the address of the mobile terminal 15 (step S178), and a series of the process comes to an end.

Figure 18:
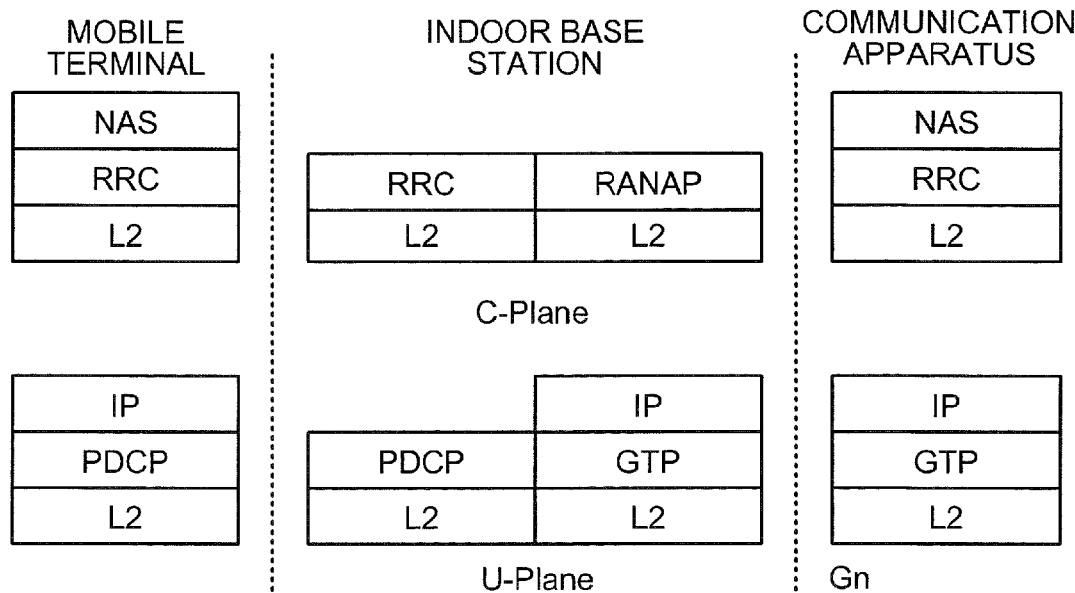
FIG. 18 is a diagram of a second exemplary functional configuration of the communication system.
Figure 19:
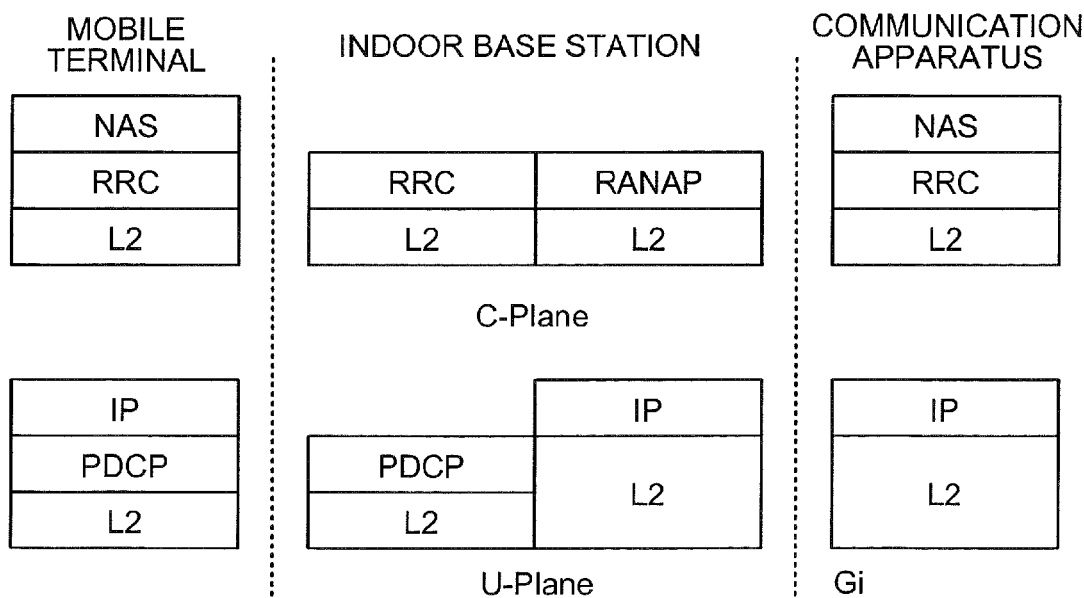
FIG. 19 is another diagram of the second exemplary functional configuration of the communication system.

FIG. 18 is a diagram of a second exemplary functional configuration of the communication system. FIG. 19 is another diagram of the second exemplary functional configuration of the communication system. In FIG. 18, description for the portions identical to those depicted in FIG. 11 will be omitted. In FIG. 19, description for the portions identical to those depicted in FIG. 12 will be omitted. FIGS. 18 and 19 depict protocol stacks of the C-Plane and the U-Plane formed when non access stratum (NAS) termination is executed by the communication apparatus 18.

The second exemplary functional configurations depicted in FIGS. 18 and 19 differ in the respect of whether the communication apparatus 18 has a GTP function in the U-Plane. In the second exemplary functional configuration depicted in FIG. 18, the communication apparatus 18 has the GTP function in the U-Plane and the communication apparatus 18 terminates the GTP. In the second exemplary functional configuration depicted in FIG. 19, the communication apparatus 18 has no GTP function and the communication apparatus 18 does not terminate the GTP. In this case, the communication apparatus 18 mainly has the SGSN/GGSN function.

"RANAP" of the indoor base station 14 and the communication apparatus 18, respectively, denotes a radio access network application part (wireless access network application unit). In the second exemplary functional configuration, the configuration is switched to the second exemplary functional configuration depicted in FIG. 18 when the mobile terminal 15 executes data communication with the mobile communication network 12, and the configuration is switched to the second exemplary functional configuration depicted in FIG. 19 when the mobile terminal 15 executes data communication with the PC 17. Thus, the mobile terminal 15 can execute data communication with both the mobile communication network 12 and the PC 17.

Figure 20:
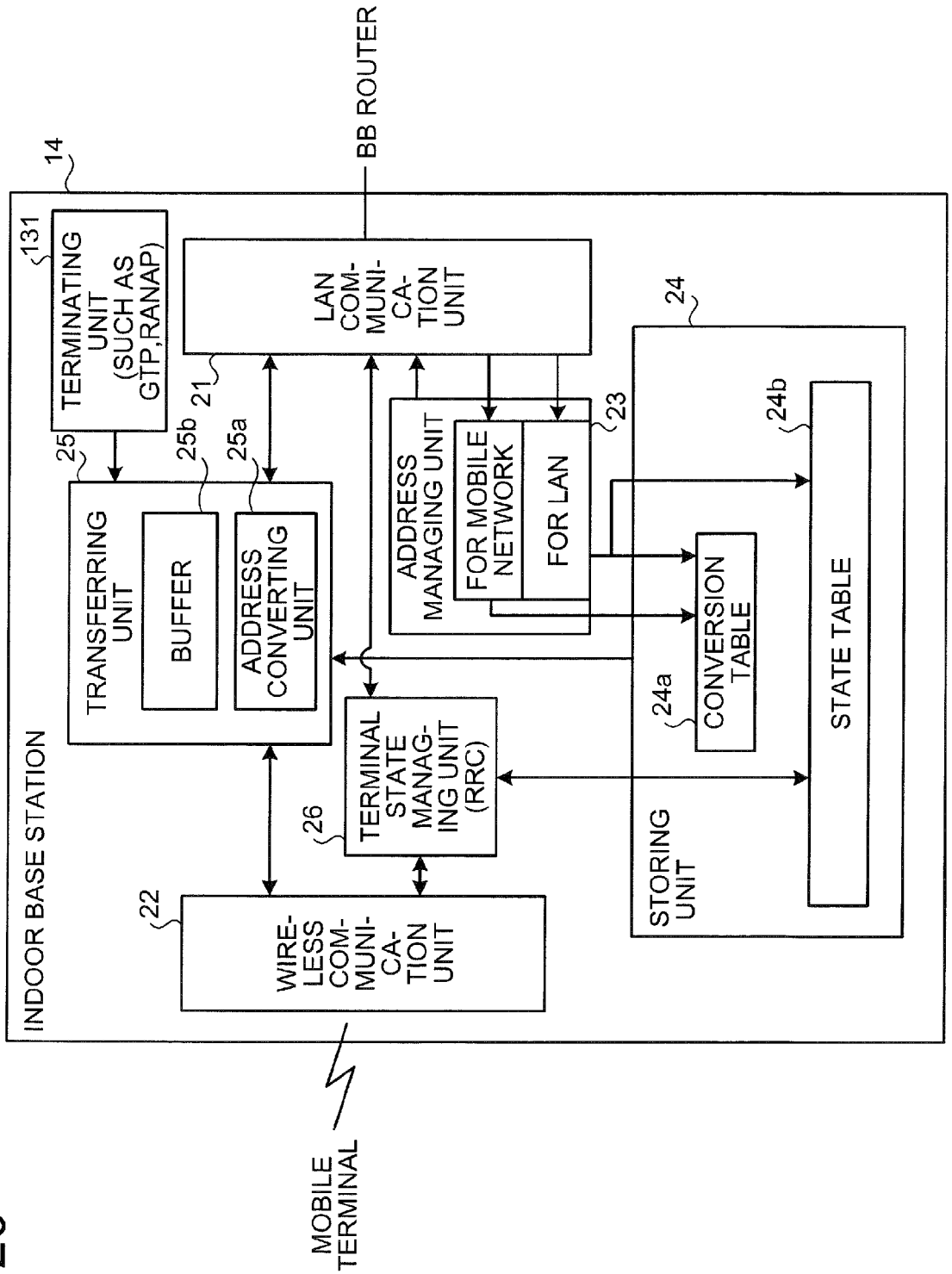
FIG. 20 is a block diagram of a configuration of the indoor base station in the second exemplary functional configuration.

FIG. 20 is a block diagram of a configuration of the indoor base station in the second exemplary functional configuration. In FIG. 20, the components identical to those depicted in FIG. 13 are given the same reference numerals respectively given in FIG. 13 and description thereof will be omitted. The terminal state managing unit 26 of the indoor base station 14 has a function of the RRC protocol of the 3GPP. Thus, the terminal state managing unit 26 can obtain the RRC state of the mobile terminal 15 and manage the state of the mobile terminal 15.

When the terminal state managing unit 26 is requested by the transferring unit 25 to switch the communication mode of the mobile terminal 15 from "power saving" to "normal", the terminal state managing unit 26 switches the communication mode of the mobile terminal 15 from "power saving" to "normal" using the RRC protocol. In this manner, the terminal state managing unit 26 does not switch the communication mode of the mobile terminal 15 by requesting the communication apparatus 18 to switch the mode but switches the communication mode of the mobile terminal 15 using the RRC protocol function.

Figure 21:
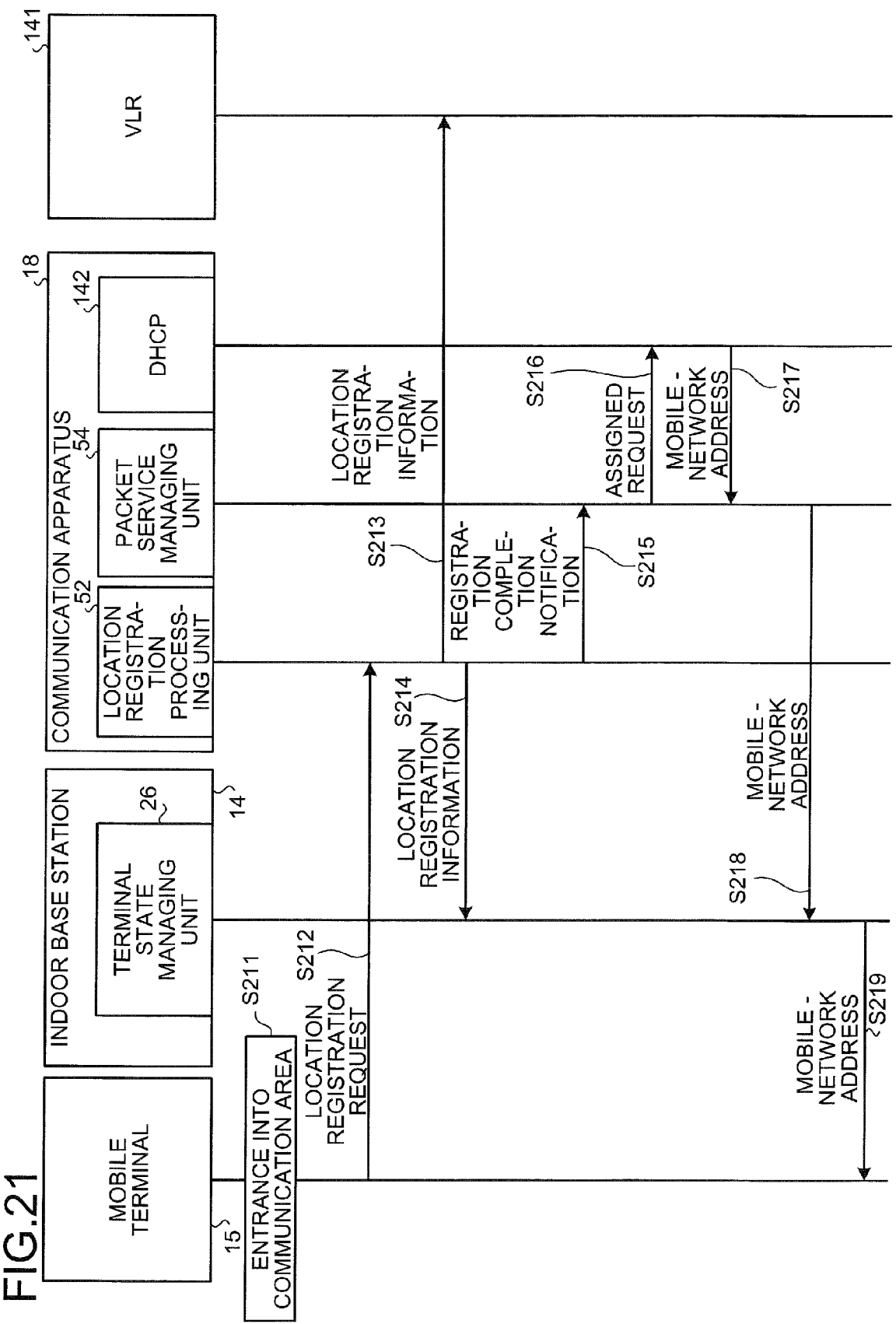
FIG. 21 is a sequence chart of an exemplary location registration operation of the communication system in the second exemplary functional configuration.

FIG. 21 is a sequence chart of an exemplary location registration operation of the communication system in the second exemplary functional configuration. In FIG. 21, steps S211 to S217 respectively are substantially identical to steps S151 to S157 (see FIG. 15) and therefore, description thereof will be omitted. When the DHCP 112 outputs the mobile-network address to the packet service managing unit 54 (step S217), the packet service managing unit 54 transmits the mobile-network address output at step S217 to the indoor base station 14 (step S218).

The indoor base station 14 transmits the mobile-network address transmitted from the packet service managing unit 54 at step S218, to the mobile terminal 15 (step S219), and a series of the process comes to an end. The transmission of the mobile-network address at step S218 is executed by transmitting the paging by the RRC function of the packet service managing unit 54.

Figure 22:
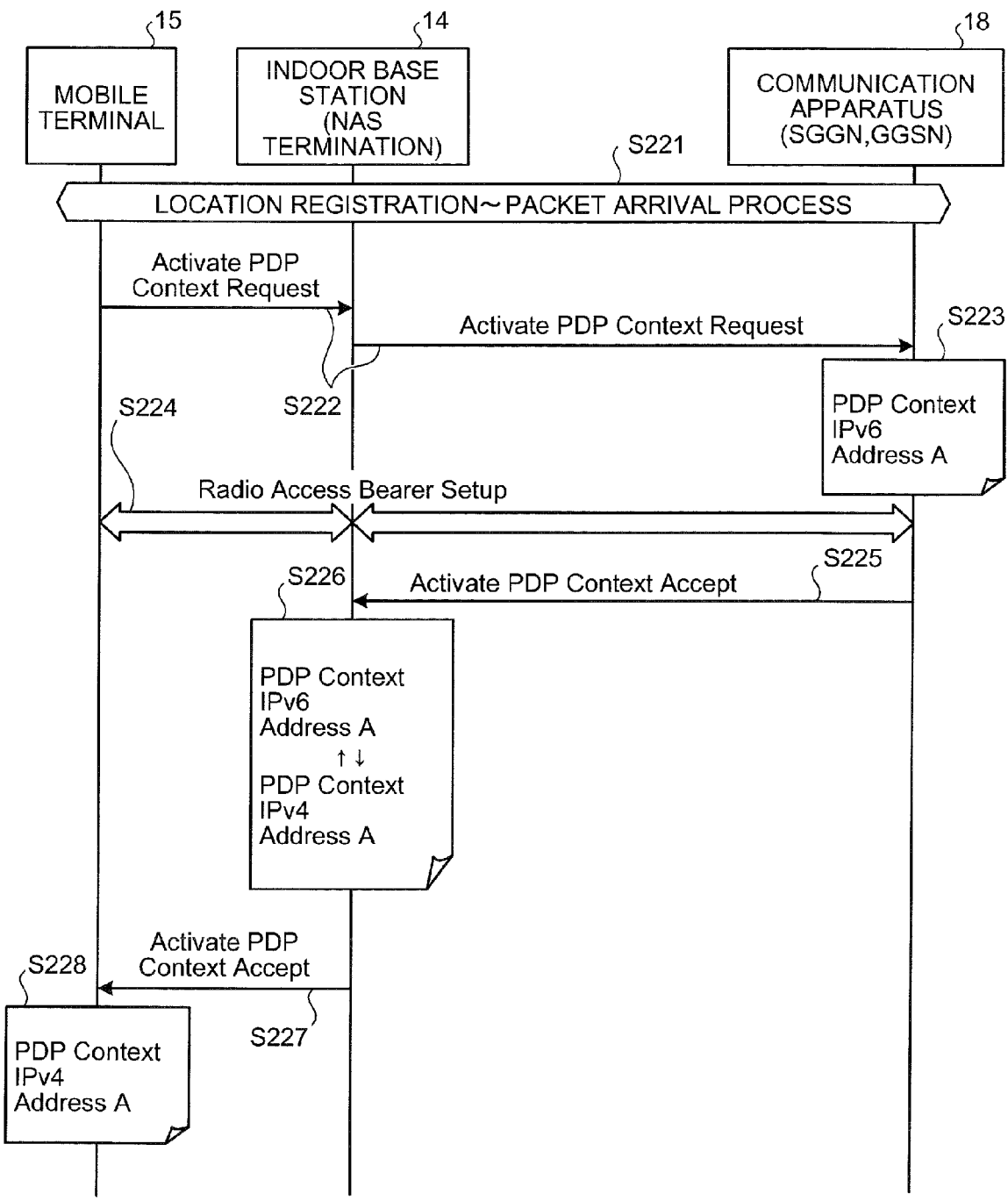
FIG. 22 is a sequence chart of a generation operation of the 3GPP Context in the second exemplary functional configuration.

FIG. 22 is a sequence chart of a generation operation of the 3GPP Context in the second exemplary functional configuration. Steps S221, and S223 to S228 depicted in FIG. 22 respectively are substantially identical to steps S171, and S173 to S178 and therefore, description thereof will be omitted. In the second exemplary functional configuration, at step S222, the indoor base station 14 terminates the connection request message transmitted from the mobile terminal 15 and transmits the connection request message terminated to the communication apparatus 18.

Figure 23:
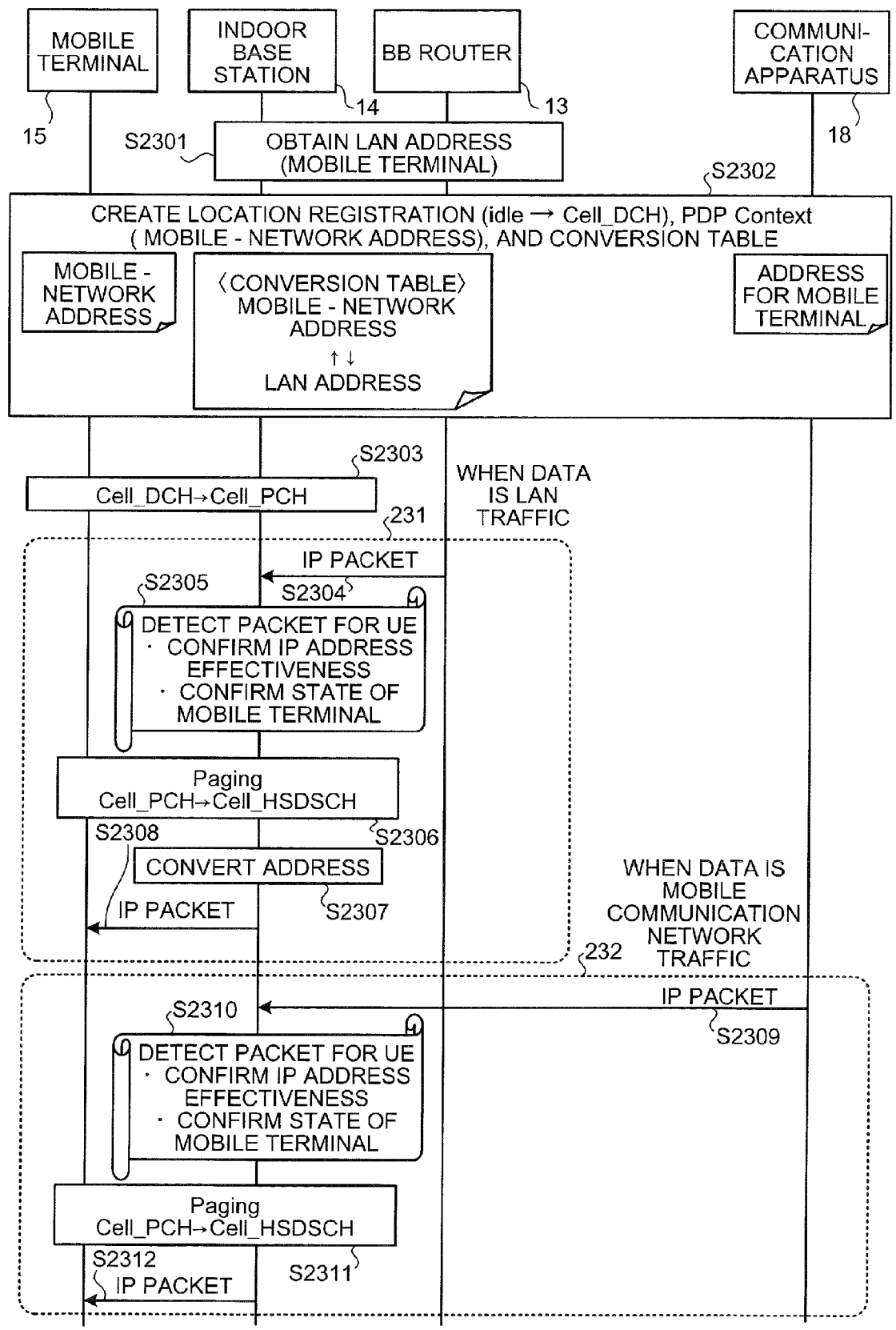
FIG. 23 is a sequence chart of an exemplary packet transfer operation in the second exemplary functional configuration.

FIG. 23 is a sequence chart of an exemplary packet transfer operation in the second exemplary functional configuration. The indoor base station 14 obtains the LAN address from the BB router 13 and assigns the obtained address to the mobile terminal 15 (step S2301). When the mobile terminal 15 enters the communication area 16, the indoor base station 14 generates the location registration, the PDP Context that includes the mobile-network address, and the conversion table 24a (step S2302).

It is assumed that, thereafter, the communication mode of the mobile terminal 15 is switched to "power saving" (Cell_DCH to Cell_PCH) (step S2303). A dotted line frame 231 indicates the packet transfer operation executed when the IP packet from the PC 17 is transmitted to the mobile terminal 15 after step S2303.

As depicted in the dotted line frame 231, the IP packet transmitted from the PC 17 is transmitted to the indoor base station through the BB router 13 (step S2304). The destination address of the IP packet transmitted at step S2304 is the LAN address that is assigned to the mobile terminal 15 at step S2301.

The indoor base station 14 detects that the indoor base station 14 has received the IP packet addressed to the mobile terminal 15 (for UE) (step S2305). The indoor base station 14, using the valid/invalid flag 42, confirms that the LAN address that is the destination address of the IP packet is valid (IP address validity confirmation). The indoor base station 14, using the valid/invalid flag 43, confirms the communication mode of the mobile terminal 15 to which the LAN address, which is the destination address of the IP packet, is assigned (mobile terminal state confirmation).

In this example, the communication mode of the mobile terminal 15 is "power saving" (Cell_PCH). The indoor base station 14 executes paging to the mobile terminal 15 and switches the communication mode of the mobile terminal 15 from "power saving" to "normal" (Cell_PCH to Cell_HSD-SCH) (step S2306).

The indoor base station 14 converts the destination address of the IP packet from the LAN address to the mobile-network address using the conversion table 24a (step S2307). The indoor base station 14 transmits the IP packet whose destination address has been converted at step S2307, to the mobile terminal 15 (step S2308). When the communication mode of the mobile terminal 15 is "normal" at step S2305, step S2306 is omitted.

A dotted line frame 232 indicates the packet transfer operation executed when the IP packet from the mobile communication network 12 is transmitted to the mobile terminal 15 after step S2303 (when the IP packet is mobile communication network traffic). As depicted in the dotted line frame 232, the IP packet transmitted from the mobile communication network 12 is transmitted to the indoor base station 14 through the BB router 13 (step S2309).

The destination address of the IP packet transmitted at step S2309 is the mobile-network address assigned to the mobile terminal 15 at step S2302. The indoor base station 14 detects the reception of the IP packet addressed to the mobile terminal 15 (for UE) (step S2310). The indoor base station 14, using the valid/invalid flag 72 (see FIG. 7), confirms that the mobile-network address, which is the destination address of the IP packet, is valid (IP address validity confirmation).

The indoor base station 14, using the communication mode flag 43, confirms the communication mode of the mobile terminal 15 to which the mobile-network address that is the destination address of the IP packet is assigned (mobile terminal state confirmation). In this example, the communication mode of the mobile terminal 15 is "power saving". The indoor base station 14 executes paging to the mobile terminal 15 and switches the communication of the mobile terminal 15 from "power saving" to "normal" (Cell_PCH to Cell_HSD-SCH) (step S2311).

The indoor base station 14 transmits to the mobile terminal 15, the IP packet detected at step S2310 (step S2312). When the communication mode of the mobile terminal 15 is "normal" at step S2310, step S2311 is omitted.

Figure 24:
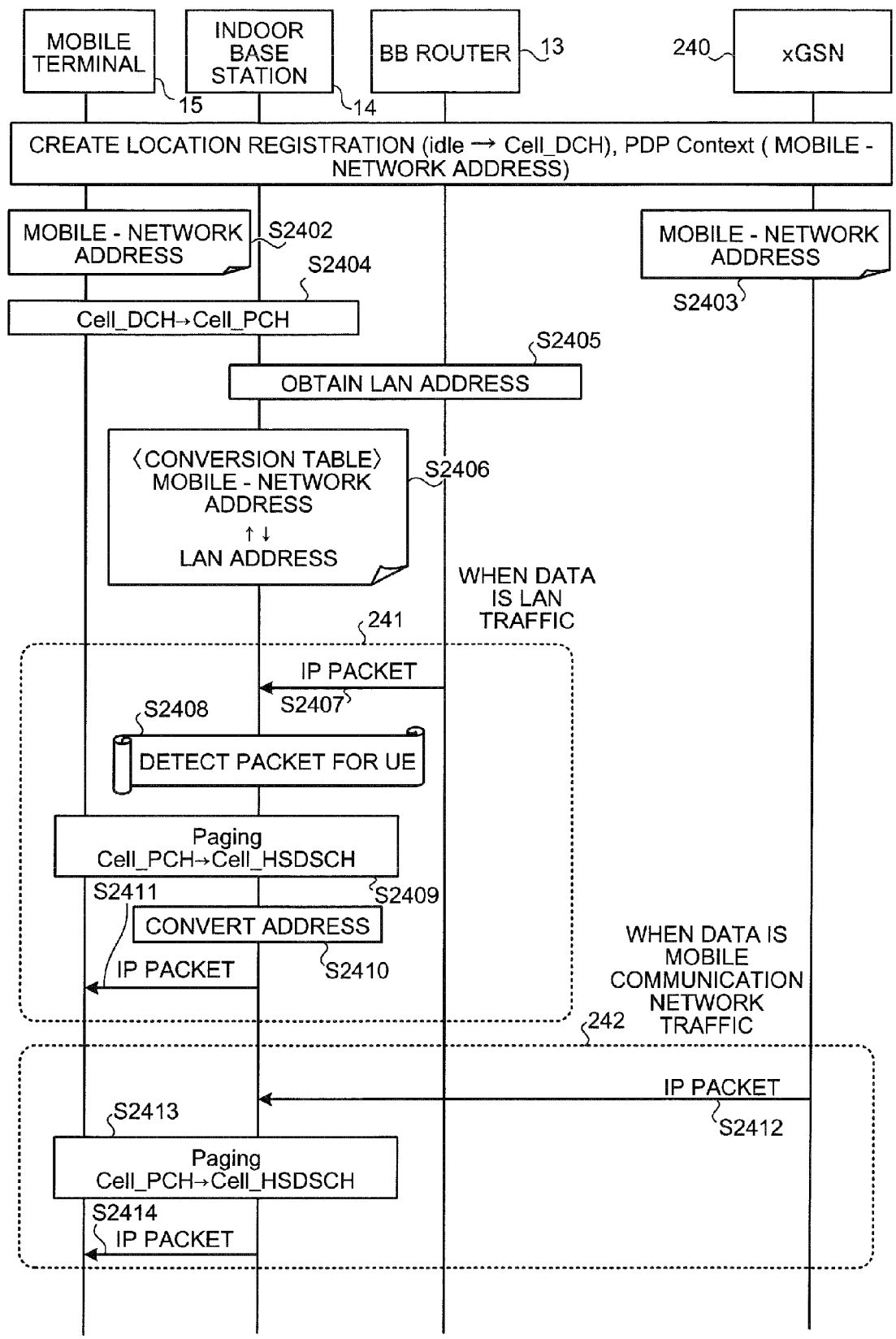
FIG. 24 is a sequence chart of another exemplary packet transfer operation in the second exemplary functional configuration.

FIG. 24 is a sequence chart of another exemplary packet transfer operation in the second exemplary functional configuration. When the mobile terminal 15 enters the communication area 16, the indoor base station 14 generates the location registration and the PDP Context that includes the mobile-network address (step S2401). The mobile terminal 15 sets the mobile-network address assigned at step S2401 as the address of the mobile terminal 15 (step S2402).

An xGSN 240 (serving/gateway General packet radio service Support Node: packet processing node) on the mobile communication network 12 obtains the mobile-network address assigned at step S2401 (step S2403). It is assumed that, thereafter, the communication mode of the mobile terminal 15 is switched to "stand by" (Cell_DCH to Cell_PCH) (step S2404).

The indoor base station 14 obtains the LAN address from the BB router 13 and assigns the obtained address to the mobile terminal 15 (step S2405). The indoor base station 14 generates the conversion table 24a that includes the mobile-network address obtained at step S2401 and the LAN address obtained at step S2405 (step S2405).

A dotted line frame 241 indicates the packet transfer operation executed when the IP packet from the PC 17 is transmitted to the mobile terminal 15 after step S2406 (when the IP packet is LAN traffic). As depicted in the dotted line frame 241, the IP packet transmitted from the PC 17 is transmitted to the indoor base station 14 through the BB router 13 (step S2407). The destination address of the IP packet transmitted at step S2407 is the LAN address assigned to the mobile terminal 15 at step S2405.

The indoor base station 14 detects the reception of the IP packet addressed to the mobile terminal 15 (for UE) (step S2408). In this case, the indoor base station 14 does not execute confirmation of the valid/invalid flag 42 or confirmation of the communication mode of the mobile terminal 15 of the LAN address. The indoor base station 14 executes paging to the mobile terminal 15 and switches the communication mode of the mobile terminal 15 from "stand by" to "normal" (Cell_PCH to Cell_HSDSCH) (step S2409).

The indoor base station 14 converts the destination address of the IP packet from the LAN address to the mobile-network address using the conversion table 24*a* (step S2410). The indoor base station 14 transmits the IP packet whose destination address is converted at step S2407, to the mobile terminal 15 (step S2411).

A dotted line frame 242 indicates the packet transfer operation executed when the IP packet from an xGSN 240 is transmitted to the mobile terminal 15 after step S2405 (when the IP packet is traffic of the mobile communication network). In the dotted line box 242, the IP packet transmitted from the xGSN 240 is transmitted to the indoor base station 14 through the BB router 13 (step S2412).

The destination address of the IP packet transmitted at step S2412 is the mobile-network address assigned to the mobile terminal 15 at step S2401. In this case, the indoor base station 14 does not execute the detection of reception of the IP packet, the confirmation of the valid/invalid flag 42 of the LAN address, or the confirmation of the communication mode of the mobile terminal 15.

The indoor base station 14 executes paging to the mobile terminal 15 and switches the communication mode of the mobile terminal 15 from "stand by" to "normal" (Cell_PCH to Cell_HSDSCH) (step S2413). The indoor base station 14 transfers the IP packet transmitted at step S2412 to the mobile terminal 15 (step S2414).

Figure 25:
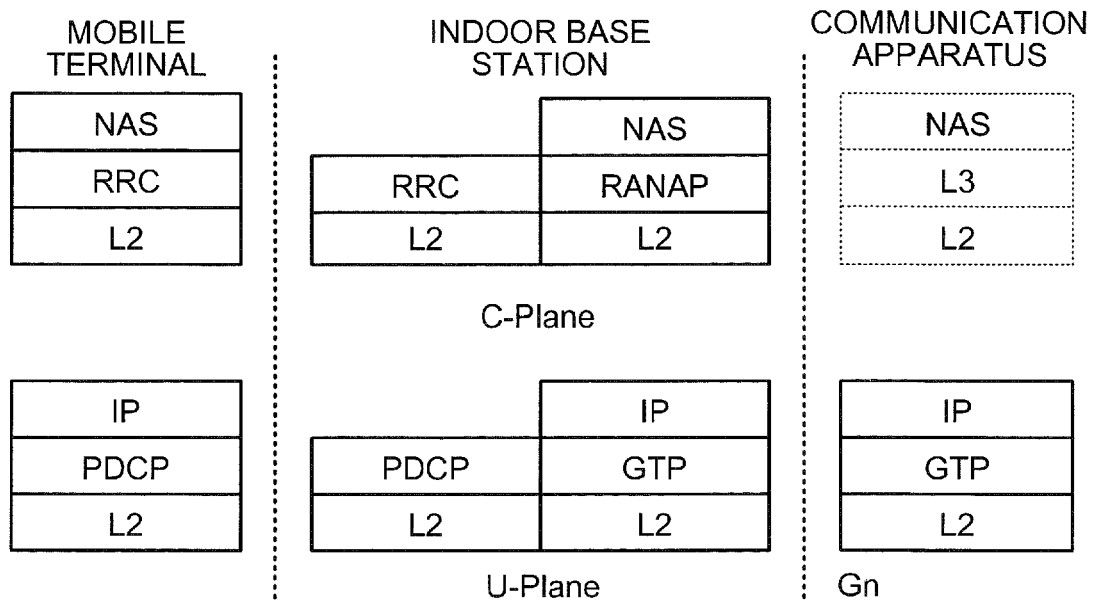
FIG. 25 is a diagram of a third exemplary functional configuration of the communication system.
Figure 26:
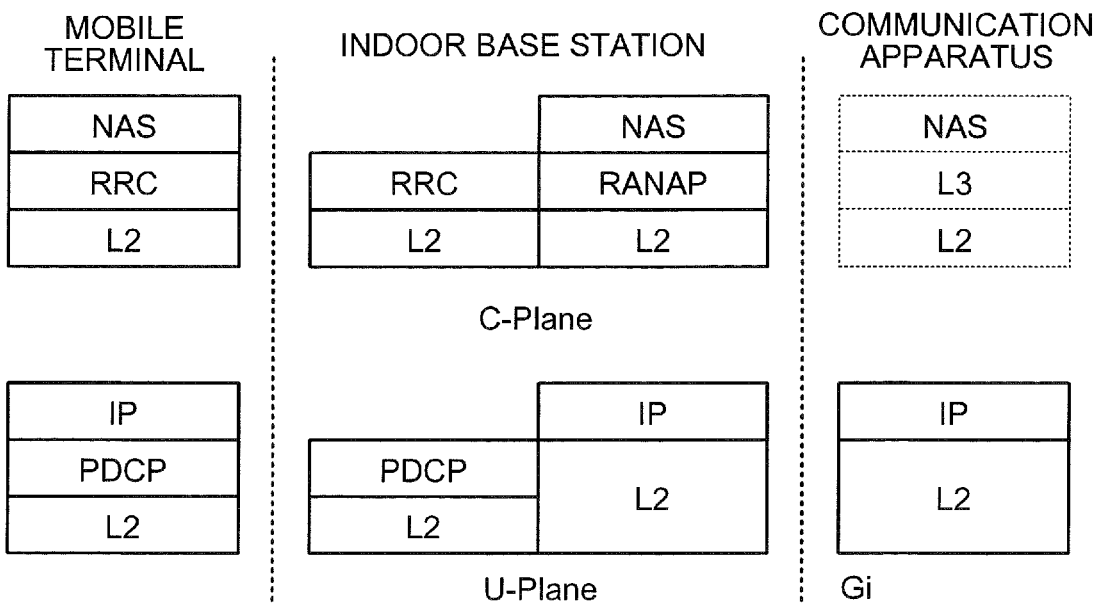
FIG. 26 is another diagram of the third exemplary functional configuration of the communication system.

FIG. 25 is a diagram of a third exemplary functional configuration of the communication system. FIG. 26 is another diagram of the third exemplary functional configuration of the communication system. In FIG. 25, description for the components identical to those depicted in FIG. 11 will be omitted. In FIG. 26, description for the components identical to those depicted in FIG. 12 will be omitted. FIGS. 25 and 26 depict protocol stacks of C-Plane and U-Plane formed when NAS termination is executed by the indoor base station 14.

The third exemplary functional configurations depicted in FIGS. 25 and 26 differ in the respect of whether the communication apparatus 18 has a GTP function in the U-Plane. In the third exemplary functional configuration depicted in FIG. 25, the communication apparatus 18 has the GTP function in the U-Plane and the communication apparatus 18 terminates the GTP. In the third exemplary functional configuration depicted in FIG. 26, the communication apparatus 18 has no GTP function and the communication apparatus 18 does not terminate the GTP. In this case, the communication apparatus 18 does not execute protocol termination.

It is assumed for the communication system 10 that the network executes the management of the mobile-network address of the mobile communication network 12. Therefore, the communication apparatus 18 manages the mobile-network address. In this case, although the communication apparatus 18 has no SGSN function, the communication apparatus 18 has a function substantially similar to the SGSN function and can assign the mobile-network address to the indoor base station 14. Further, the communication apparatus 18 may have a function concerning the location registration (a dotted line depicted).

Figure 27:
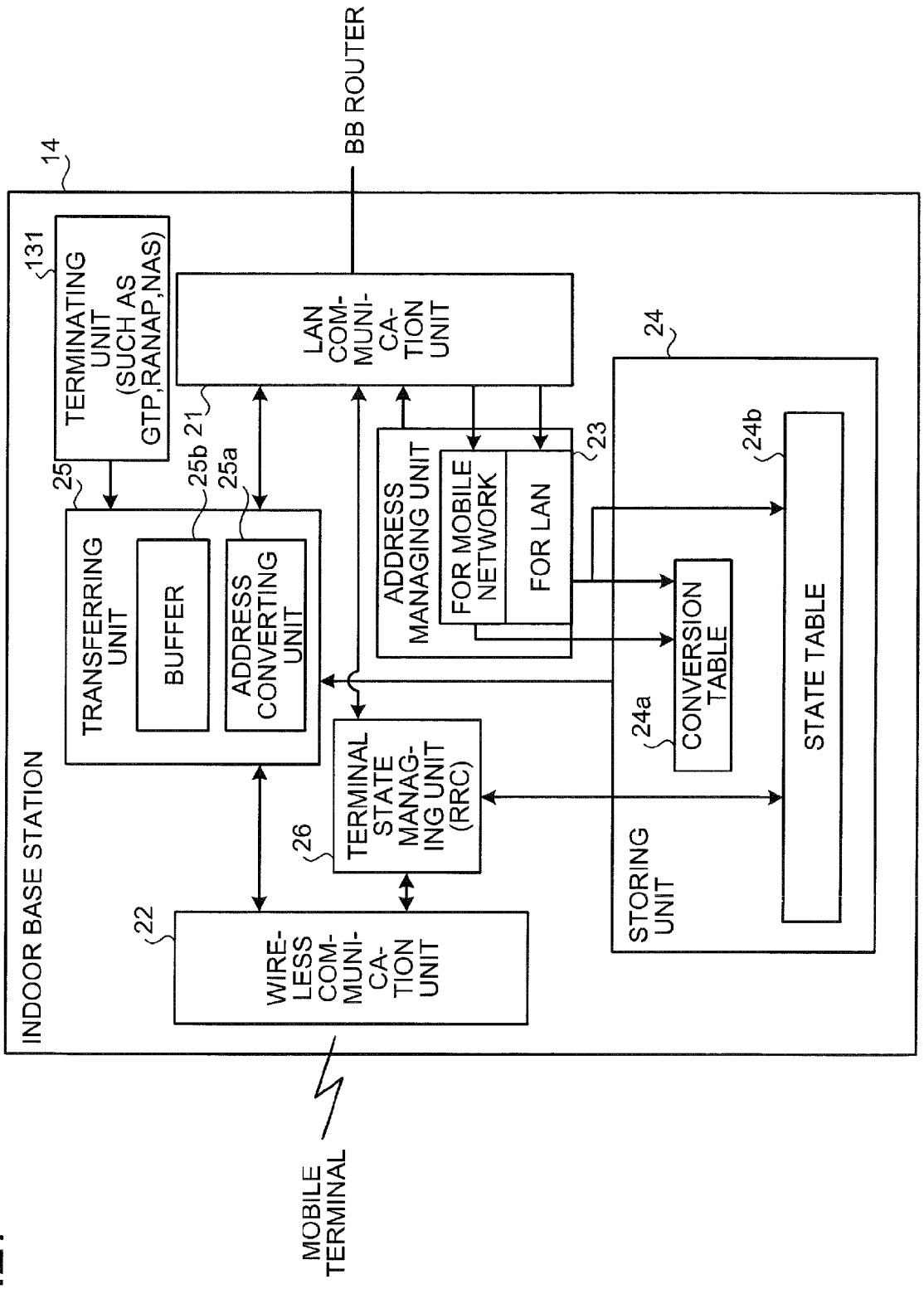
FIG. 27 is a block diagram of a configuration of the indoor base station in the third exemplary functional configuration.

FIG. 27 is a block diagram of a configuration of the indoor base station in the third exemplary functional configuration. In FIG. 27, components identical to those depicted in FIG. 20 are given the same reference numerals respectively given in FIG. 20 and the description thereof will be omitted. As depicted in FIG. 27, in the third exemplary functional configuration, the NAS is terminated by the indoor base station 14. The location registration operation of the communication system 10 in the third exemplary functional configuration is identical to the location registration operation depicted in FIG. 21 and therefore, description thereof will be omitted.

Figure 28:
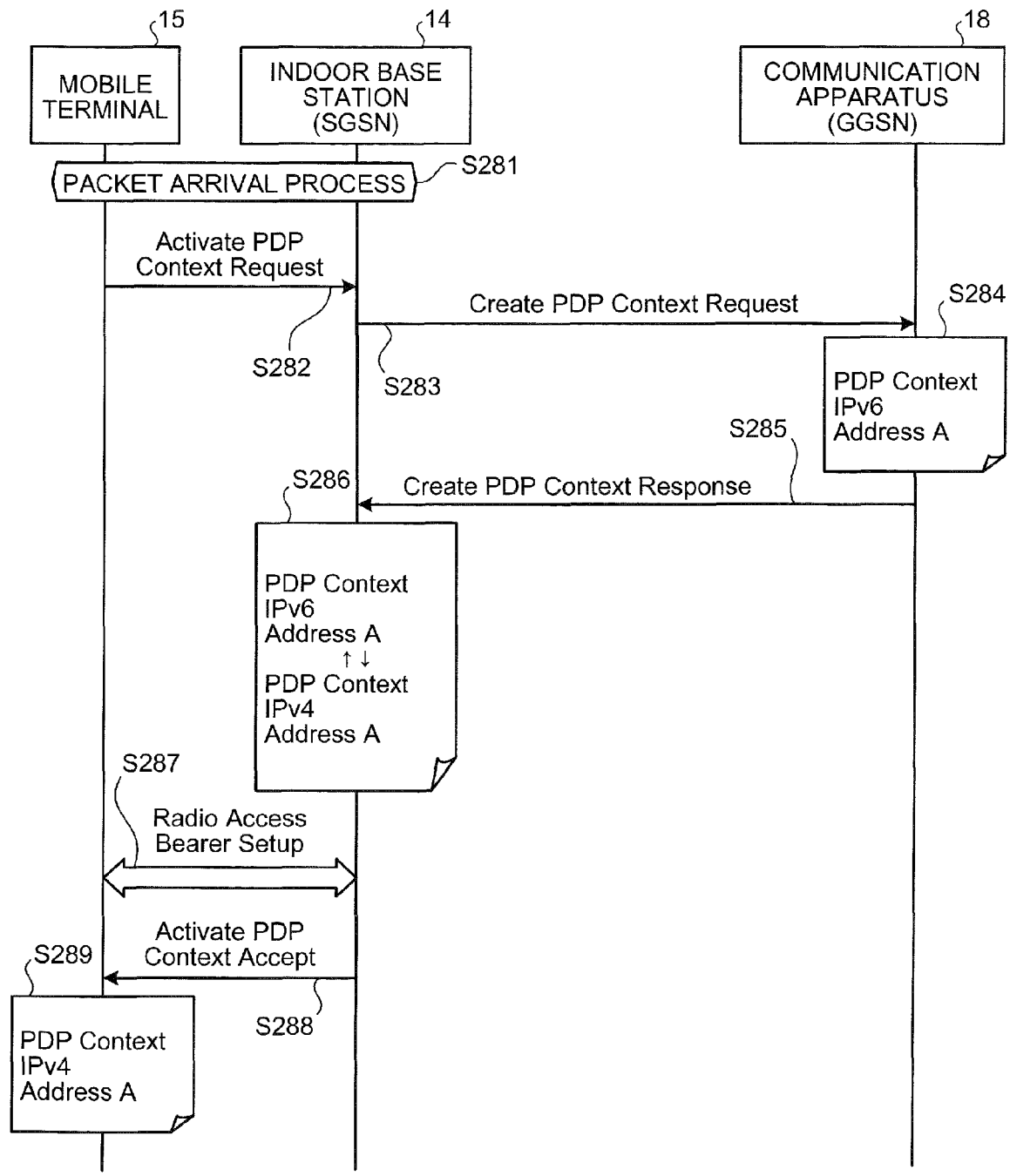
FIG. 28 is a sequence chart of an exemplary location registration operation of the communication system in the third exemplary functional configuration.

FIG. 28 is a sequence chart of an exemplary location registration operation of the communication system in the third exemplary functional configuration. In FIG. 28, an example where the third exemplary functional configuration is applied to a generation sequence for the PDP Context under the 3GPP (see 3GPP TS23.060) will be described. A message concerning the PDP Context generation requested from the mobile terminal 15 is checked at the indoor base station 14.

In the third exemplary functional configuration, a protocol to terminate a message, from the communication apparatus 18, that notifies the mobile terminal 15 of the mobile-network address is implemented in the communication apparatus 18. Therefore, the communication apparatus 18 checks the PDP Context and corrects the address portion for the mobile network. The mobile terminal 15 and the indoor base station 14 execute a packet arrival process (step S281).

The mobile terminal 15 transmits a connection request message (Activate PDP Context Request) to the indoor base station 14 (step S282). The indoor base station 14 transmits Create PDP Context Request to the communication apparatus 18 (step S283).

The communication apparatus 18 creates the PDP Context that has an IPv6 mobile-network address (Address "A") (step S284). The communication apparatus 18 transmits the PDP Context created at step S284 as Create PDP Context Response (step S285).

The indoor base station 14 generates the conversion table 24*a* that includes an IPv6 mobile-network address stored in the Create PDP Context Response transmitted at step S285 and an IPv4 mobile-network address (Address "A") (step S286).

The mobile terminal 15 and the indoor base station 14 mutually establish a communication path (Radio Access Bearer Setup) (step S287). The indoor base station 14 transmits the IPv4 mobile-network address (Address "A") for which the conversion table 24*a* is generated at step S286 to the mobile terminal 15 using a connection permission message (Activate PDP Context Accept) (step S288).

The mobile terminal 15 sets the IPv4 mobile-network address (Address "A") stored in the connection permission message transmitted at step S287 as the address of the mobile terminal 15 (step S289), and a series of the process comes to an end. Thus, even when the mobile-network address used in the mobile communication network 12 is for IPv6 and the mobile-network address that the mobile terminal 15 supports is for IPv4, an IP packet transmitted from the PC 17 or the mobile communication network 12 can be transferred to the mobile terminal 15.

As described, according to the base station and the data transferring method disclosed herein, a packet (the IP packet) can be transmitted at a high speed from a communication terminal (the PC 17) to a mobile terminal 15 in a network on the premises (the LAN 11) without adding any further function to the mobile terminal.

In the embodiments, the PC 17 is taken as an example of and described as a communication terminal in the LAN 11. However, the communication terminal in the LAN 11 is not limited to the PC 17 and any computer apparatus that has a communication function under the femto-cell scheme such as a home appliance having a communication function may be used.

According to the configuration described, a communication terminal can use a local-network address to transmit packets to a mobile terminal. Meanwhile, the mobile terminal can receive packets from the communication terminal by using a mobile-network address. Further, at a base station communicating directly with the mobile terminal, by converting the destination of data from a local-network address to a mobile-network address, the data can be transmitted directly to the mobile terminal without passing through the mobile communication network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A base station that forms a communication area that is communicable with a mobile communication network through a local network that includes the base station, the base station comprising:
    a first obtaining unit that obtains a local-network address assigned from the local network to a mobile terminal in the communication area to execute data communication with a communication terminal in the local network;
    a second obtaining unit that obtains a mobile-network address assigned from the mobile communication network to the mobile terminal to execute data communication with the mobile communication network;
    a storing unit that correlates and stores therein the local-network address obtained by the first obtaining unit and the mobile-network address obtained by the second obtaining unit;
    a receiving unit that receives, from the communication terminal, data having a destination address that is the local-network address;
    a converting unit that converts the destination address of the data received by the receiving unit into the mobile-network address correlated with the local-network address and stored in the storing unit; and
    a transmitting unit that transmits, to the mobile terminal, the data whose destination address has been converted by the converting unit.

2. The base station according to claim 1, further comprising a managing unit that, when the data is received by the receiving unit, switches a communication mode of the mobile terminal to a communication mode that enables reception of the data, wherein
    the transmitting unit transmits the data to the mobile terminal whose communication mode has been switched by the managing unit.

3. The base station according to claim 1, wherein the second obtaining unit obtains the mobile-network address when a location registration of the mobile terminal is executed in the mobile communication network.

4. The base station according to claim 1, wherein the storing unit stores therein the local-network address and the mobile-network address until the mobile terminal leaves the communication area.

5. The base station according to claim 1, further comprising an address managing unit that returns the mobile-network address assigned to the mobile terminal to the mobile communication network when the mobile terminal leaves the communication area.

6. A data transferring method of a base station that forms a communication area that is communicable with a mobile communication network through a local network that includes the base station, the data transferring method comprising:
    obtaining a local-network address assigned from the local network to a mobile terminal in the communication area to execute data communication with a communication terminal in the local network;
    obtaining a mobile-network address assigned from the mobile communication network to the mobile terminal to execute data communication with the mobile communication network;
    storing, in correlation, the local-network address obtained at the obtaining the local-network address and the mobile-network address obtained at the obtaining the mobile-network address;
    receiving, from the communication terminal, data having a destination address that is the local-network address;
    converting the destination address of the data received at the receiving into the mobile-network address correlated with the local-network address and stored at the storing; and
    transmitting, to the mobile terminal, the data whose destination address has been converted at the converting.

* * * * *